(12) United States Patent
Shestak et al.

(10) Patent No.: US 8,587,642 B2
(45) Date of Patent: Nov. 19, 2013

(54) AUTOSTEREOSCOPIC DISPLAY SYSTEM

(75) Inventors: Sergey Shestak, Suwon-si (KR); Dae-sik Kim, Suwon-si (KR); Kyung-hoon Cha, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1169 days.

(21) Appl. No.: 12/244,803

(22) Filed: Oct. 3, 2008

(65) Prior Publication Data

US 2009/0201362 A1    Aug. 13, 2009

(30) Foreign Application Priority Data

Feb. 13, 2008   (KR) ........................ 10-2008-0013098

(51) Int. Cl.
*H04N 13/04* (2006.01)

(52) U.S. Cl.
USPC ............................................ 348/56; 348/55

(58) Field of Classification Search
USPC .................. 348/52, 51, 56, 740, 840, 841, 55
See application file for complete search history.

(56) References Cited

U.S. PATENT DOCUMENTS

| 5,917,539 | A  | * | 6/1999 | Sorensen et al. ................. 348/56 |
| 7,190,518 | B1 | * | 3/2007 | Kleinberger et al. ......... 359/465 |
| 7,239,293 | B2 | * | 7/2007 | Perlin et al. ....................... 345/7 |
| 7,876,350 | B2 | * | 1/2011 | Shin et al. ........................ 348/51 |
| 2007/0046777 | A1 | * | 3/2007 | Song et al. ....................... 348/56 |
| 2008/0024598 | A1 | * | 1/2008 | Perlin et al. ..................... 348/55 |
| 2009/0201362 | A1 | * | 8/2009 | Shestak et al. .................. 348/56 |
| 2010/0026795 | A1 | * | 2/2010 | Moller et al. .................... 348/56 |

* cited by examiner

*Primary Examiner* — Gregory Todd
(74) *Attorney, Agent, or Firm* — Sughrue Mion, PLLC

(57) ABSTRACT

An autostereoscopic display system is provided. The autostereoscopic display system includes: an image panel being divided into two or more display regions, each of which alternately displays an image for a left eye and an image for a right eye; an optical shutter which is spaced apart from the image panel, including three or more shutter segments capable of being switched between a transparent state and a non-transparent state, and guiding an image for a left eye and an image for a right eye which are displayed on the image panel to left and right eyes of a viewer, respectively; and a control unit which controls the optical shutter being synchronized with the image for a left eye and the image for a right eye which are displayed on the image panel.

17 Claims, 19 Drawing Sheets

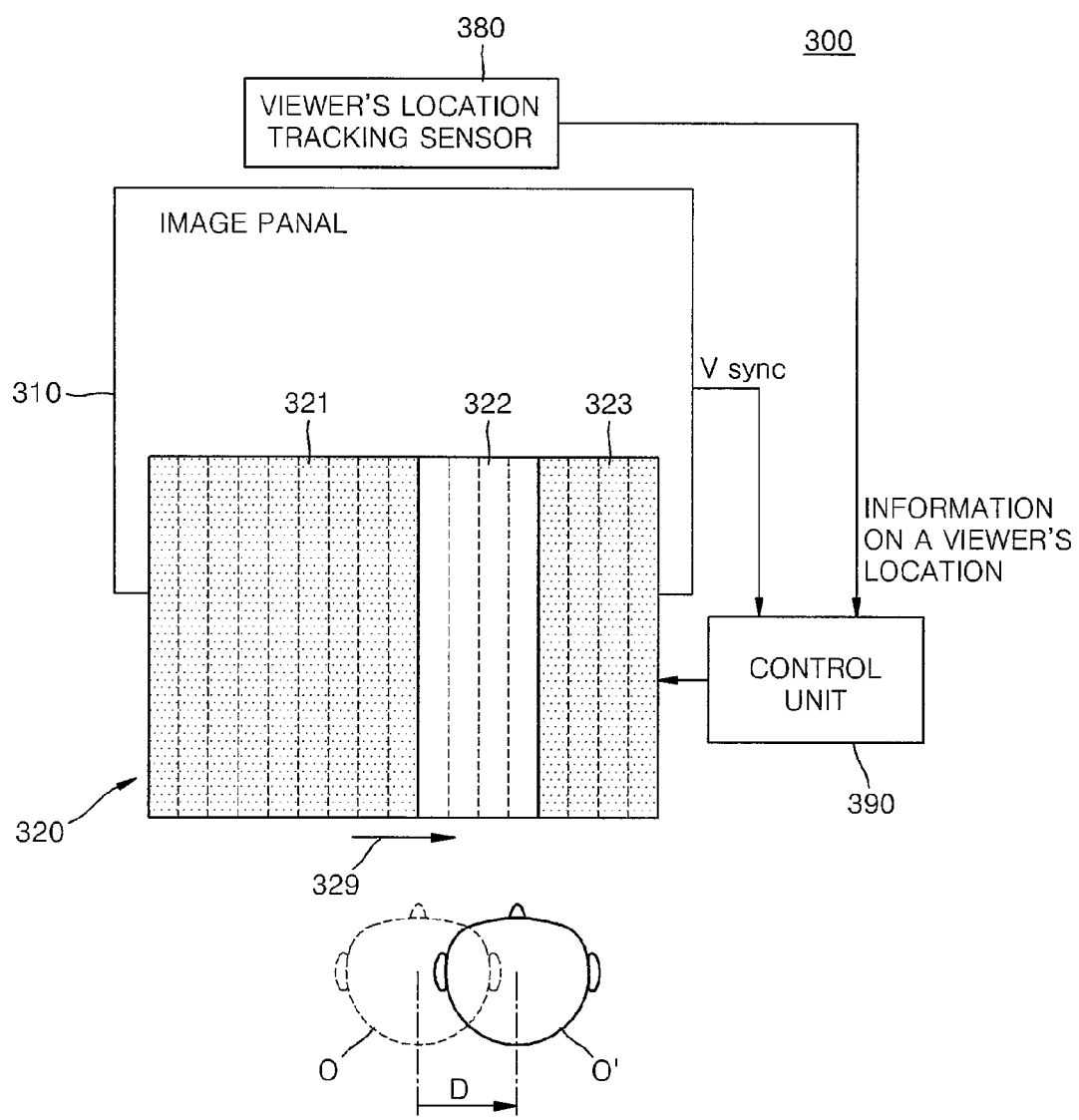

AUTOSTEREOSCOPIC DISPLAY SYSTEM

CROSS-REFERENCE TO RELATED PATENT APPLICATIONS

This application claims priority from Korean Patent Application No. 10-2008-0013098, filed on Feb. 13, 2008, in the Korean Intellectual Property Office, the disclosure of which is incorporated herein in its entirety by reference.

BACKGROUND OF THE INVENTION

1. Field of the Invention

Systems consistent with the present invention relate to an autostereoscopic display system, and more particularly, to an autostereoscopic display system having a simple optical structure in which an image for a left eye is guided to a left eye of a viewer and an image for a right eye is guided to a right eye of the viewer.

2. Description of the Related Art

Examples of a three-dimensional image display method using an image panel, such as a cathode ray tube (CRT), a plasma display panel (PDP), or a projection display, include a stereoscopic image display method. To see a stereoscopic image by using the stereoscopic image display method, a parallax barrier should be disposed in proximity of an image panel, or a viewer should wear shutter glasses.

FIG. 1 is a schematic view of a conventional parallax barrier-type stereoscopic image device. Referring to FIG. 1, the conventional parallax barrier-type stereoscopic image device includes an image panel 10 and a parallax barrier 20 disposed in front of the image panel 10. An image for a left eye and an image for a right eye are alternately alternatively arranged in vertical pixels of the image panel 10. For example, odd-number vertical pixels display the image for a left eye, and even-number vertical pixels display the image for a right eye. In the parallax barrier 20, light transmission regions 20a and light shield regions 20b, each of which has a vertical stripe shape, are alternately aligned. The alternately aligned light transmission regions 20a and light shield regions 20b correspond to the vertical pixels of the image panel 10, respectively. In such a structure, the images for left and right eyes of the image panel 10 have a predetermined orientation when viewed through the parallax barrier 20, and thus the image for a left eye is guided to the viewer's left eye and the image for a right eye is guided to the viewer's right eye. That is, half of the entire pixels of the image panel 10 are used to display the image for a left eye and the other half is used to display the image for a right eye. Therefore, the resolution of the stereoscopic image is half the resolution of a 2-dimensional image of the image panel 10. In order to use the resolution of a 2-dimensional image of the image panel 10 itself as the resolution of the stereoscopic image, the conventional parallax barrier-type stereoscopic image device needs an active-type light shutter, which alternately changes the light transmission regions 20a and light shield regions 20b of the parallax barrier 20, as the parallax barrier 20.

FIG. 2 is a schematic view of a conventional glasses-type stereoscopic image display system. Referring to FIG. 2, the conventional glasses-type stereoscopic image display system includes an image panel 50 which alternately displays an image for a left eye and an image for a right eye, and shutter glasses 60 which are synchronized with the alternative image display and selectively shields a left eye or a right eye. The shutter glasses 60 include a liquid crystal 61 and transparent electrodes 62, 63, and 64, wherein the transparent electrode 62 is disposed on one surface of the liquid crystal 61 and the transparent electrodes 63 and 64 are disposed on the other surface of the liquid crystal 61. The shutter glasses 60 shield or transmit light based on the principle that a polarization of the light which is transmitted through the liquid crystal varies when a voltage is applied or not. In this regard, the shutter glasses 60 are synchronized with a vertical synchronizing signal of the image panel 50, and a viewer alternately watches the image for a left eye and the image for a right eye which are alternately displayed on the image panel 50.

However, in the conventional parallax barrier-type stereoscopic image device, the size of the parallax barrier 20 should be almost similar to that of the image panel 10. Therefore, to obtain a large-screen stereoscopic image, the size of the parallax barrier 20 should be increased and thus the manufacturing costs are increased. Also, the alternately aligned light transmission and shield regions of the parallax barrier 20 should precisely correspond to pixels of the image panel 10, respectively. In addition, the image panel 10 should be a flat panel and location of pixels should be precisely defined therein.

In the conventional glasses-type stereoscopic image display system, a user, that is, a viewer should wear glasses, such as shutter glasses.

SUMMARY OF THE INVENTION

Systems consistent with the present invention provide an autostereoscopic display system including a simple optical shutter without having to use glasses.

According to an aspect of the present invention, there is provided an autostereoscopic display system including: an image panel including at least two display regions, each of which alternately displays an image for a left eye and an image for a right eye; an optical shutter which is spaced apart from the image panel, including at least three shutter segments capable of being switched between a transparent state and a non-transparent state, and guides an image for a left eye and an image for a right eye which are displayed on the image panel to left and right eyes of a viewer, respectively; and a control unit which controls the optical shutter being synchronized with the image for a left eye and the image for a right eye which are displayed on the image panel.

The image panel may be divided into the display regions in a vertical direction and the shutter segments are aligned in a horizontal direction.

When the number of the shutter segments of the optical shutter is N, the number of the divided display regions may be N−1.

A horizontal length of the optical shutter may be equal to or smaller than a horizontal length of an image displayed on the image panel.

A shutter segment disposed in an outer portion of the optical shutter may be equal to or greater than the shutter segment disposed in the inner portion of the optical shutter.

The image panel may be selected from the group including a liquid crystal display (LCD) panel, an organic light-emitting diode (OLED) panel, a plasma display panel (PDP), a projection screen, a field emission display (FED) panel, and a cathode ray tube (CRT) display.

When the image panel displays an image line by line, each of the shutter segments includes a plurality of horizontal sub segments aligned in a scanning direction of an image line, in which the horizontal sub segments are switched corresponding to the scanning of image lines displayed on the image panel.

The number of horizontal sub segments included in each of the shutter segments may be equal to or smaller than the number of the image lines of the image panel. For example, each of the shutter segments may have a few to tens of horizontal sub segments.

Each of the shutter segments includes a plurality of vertical sub segments which are aligned in a horizontal direction and are independently switched.

The autostereoscopic display system may further include a viewer's location tracking sensor, wherein the control unit re-groups the vertical sub segments according to the location of the viewer detected by the viewer's location tracking sensor and boundaries of the shutter segments are shifted.

The size of the image panel may be smaller than the size of the entire region of at least two display regions on which an image is displayed.

The autostereoscopic display system may further include a viewer's location tracking sensor, wherein the control unit changes the location of at least two display regions according to the location of the viewer detected by the viewer's location tracking sensor and boundaries of the shutter segments are shifted.

BRIEF DESCRIPTION OF THE DRAWINGS

The above and other features and advantages of the present invention will become more apparent by describing in detail exemplary embodiments thereof with reference to the attached drawings in which:

FIG. 11 is a schematic view of an autostereoscopic image display system according to another exemplary embodiment of the present invention;

DETAILED DESCRIPTION OF EXEMPLARY EMBODIMENTS OF THE INVENTION

Figure 1:
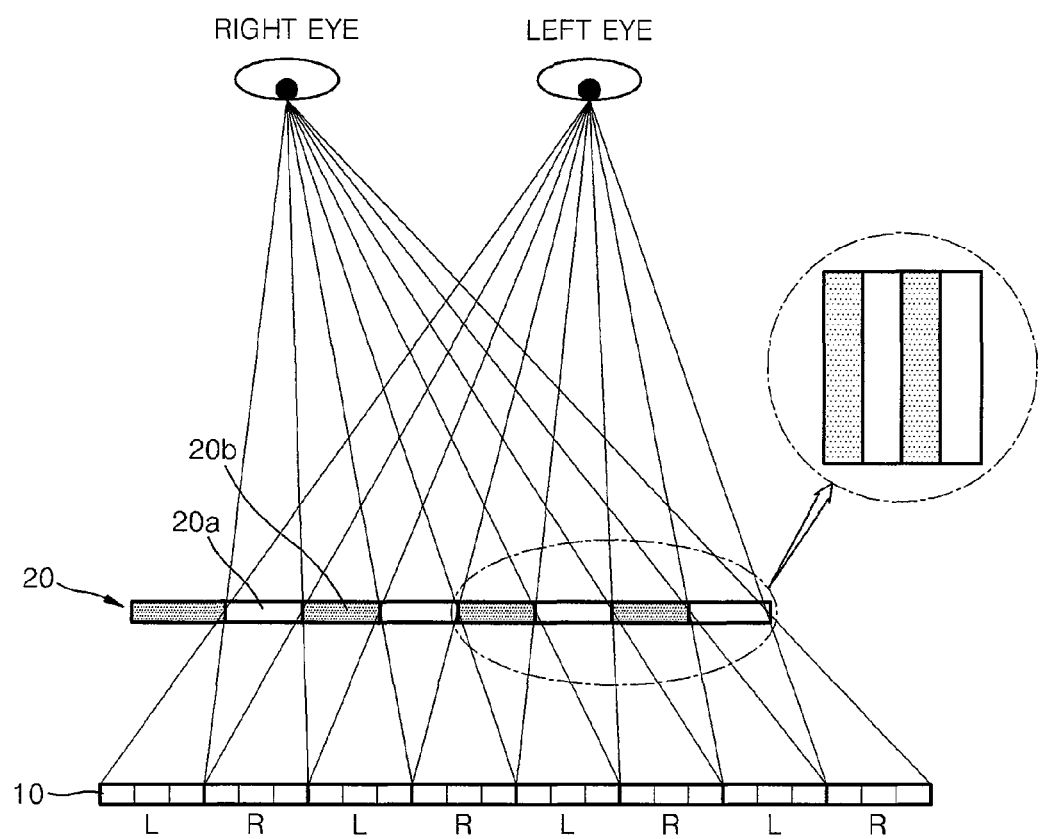
FIG. 1 is a schematic view of a conventional parallax barrier-type stereoscopic image display system.
Figure 2:
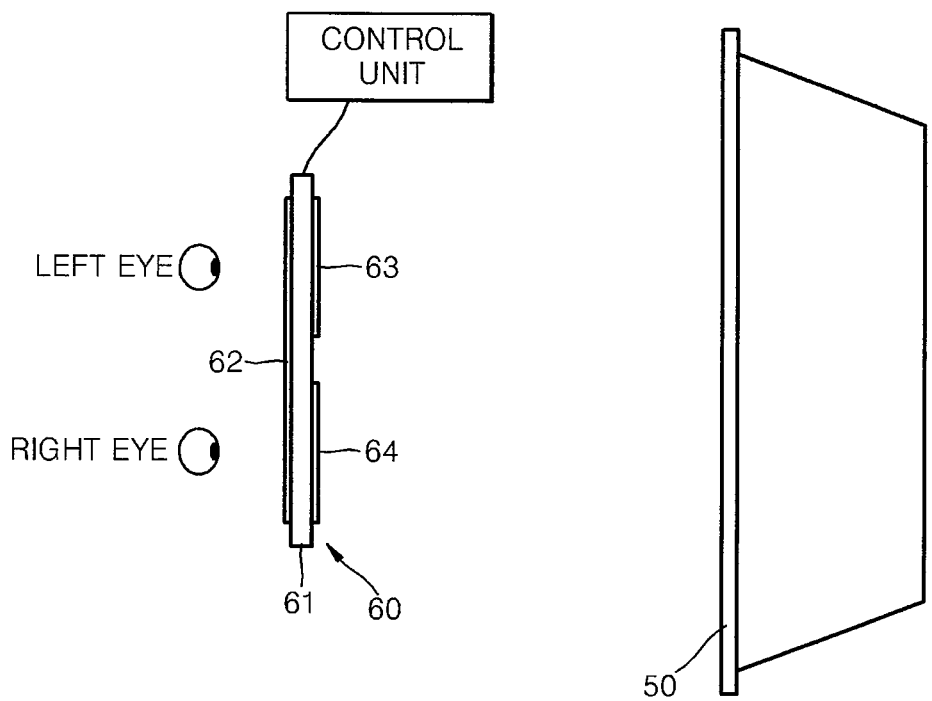
FIG. 2 is a schematic view of a conventional glasses-type stereoscopic image display system.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those of ordinary skill in the art. In the drawings, the thicknesses of layers and regions are exaggerated for clarity. Like reference numerals in the drawings denote like elements.

Figure 3:
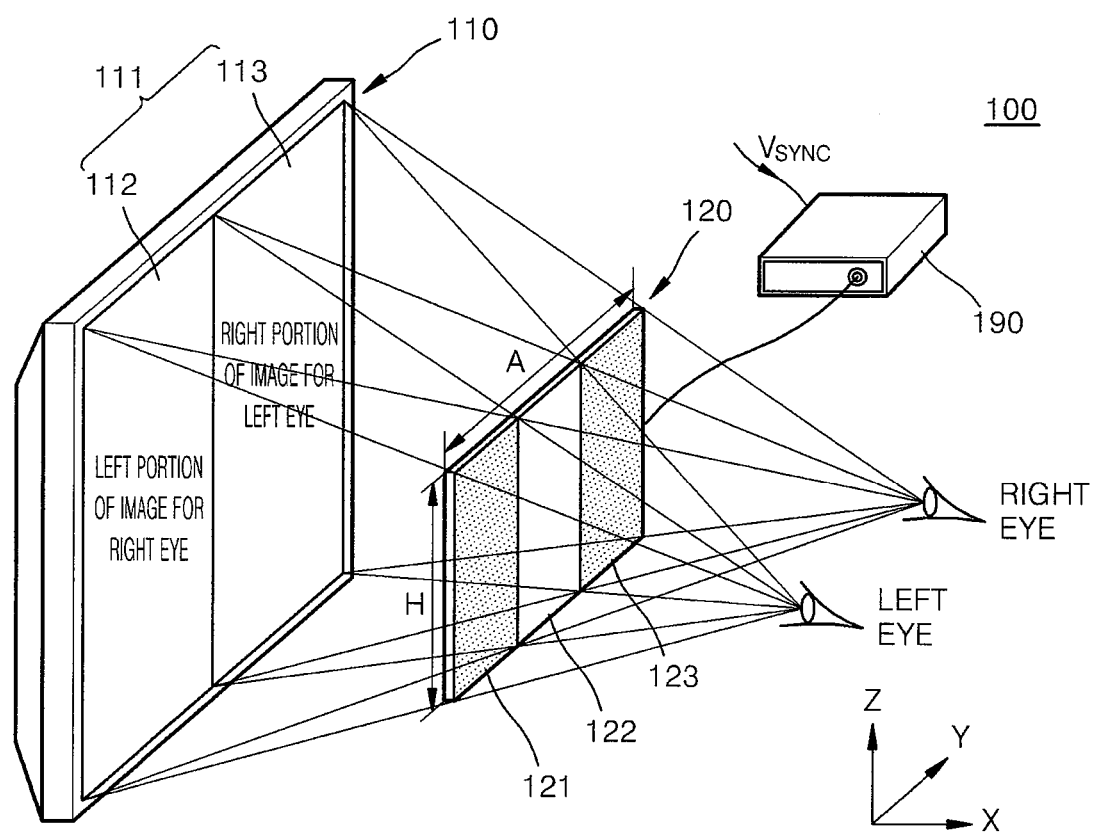
FIG. 3 is a schematic view of an autostereoscopic image display system according to an exemplary embodiment of the present invention.

FIG. 3 is a schematic view of an autostereoscopic image display system 100 according to an exemplary embodiment of the present invention.

Referring to FIG. 3, the autostereoscopic image display system 100 according to the current exemplary embodiment includes an image panel 110, an optical shutter 120, and a control unit 190.

The image panel 110 displays an image for a left eye and an image for a right eye which form a stereoscopic image, and the image panel 110 can be a conventional display panel, such as a liquid crystal display (LCD) panel, an organic light-emitting diode (OLED) panel, a plasma display panel (PDP) panel, a projection screen, a field emission display (FED) panel, or a cathode ray tube (CRT) display. In the current exemplary embodiment, the type of the image panel 110 can be selected without any consideration of a scanning method, such as a spot scanning method, a line scanning method, or a surface scanning method. In the current exemplary embodiment, a display surface 111 of the image panel 110 may be, but is not limited to, a flat surface. For example, the display surface 111 can be a curved surface, such as in a CRT display. In addition, although the illustrated image panel 110 is rectangular, the shape of the image panel 110 is not limited thereto. For example, the image panel 110 can have various shapes suitable for an arcade game player and for driving and flight simulation devices.

The display surfaces 111 of the image panel 110 is divided into first and second display regions 112 and 113 in a vertical direction, and the image for a left eye and the image for a right eye are alternately displayed in each of the first and second display regions 112 and 113. Since the first and second display regions 112 and 113 respectively correspond to a view range of the right eye and a view range of the left eye and are divided in left and right directions, the boundary between the first and second display regions 112 and 113 is vertical. A specific display type of the image panel 110 will be described in detail later with reference to FIGS. 6A to 7B.

The optical shutter 120 guides the image for a left eye displayed in the image panel 110 and the image for a right eye displayed in the image panel 110 to the viewer's left eye and the viewer's right eye, respectively, and is disposed between the image panel 110 and the viewer, in which the optical shutter 120 is spaced apart from the image panel 110. In the optical shutter 120, first to third shutter segments 121, 122, and 123, which are switched between a transparent state and a non-transparent state, are aligned in a horizontal direction. The minimum size of the optical shutter 120 may be determined according to the location relationship between the image panel 110 and the optical shutter 120, which can be understood with reference to FIG. 3. The horizontal width A or height H of the optical shutter 120 may be greater than an allowable minimum size, according to the viewer's movement. In this regard, the horizontal width A or height H of the optical shutter 120 may be equal to or smaller than the width and height of the image panel 110. The horizontal width A of the first to third shutter segments 121, 122, and 123 will be described in detail later with reference to FIG. 5. FIG. 3 illustrates an exemplary embodiment of an image displayed on the image panel 110 and the state of the optical shutter 120.

The control unit 190 is synchronized with the images for left and right eyes displayed on the image panel 110 and controls the optical shutter 120, which will be described in detail later together with the display of the image panel 110 with reference to FIGS. 6A to 7B.

Figure 4A:
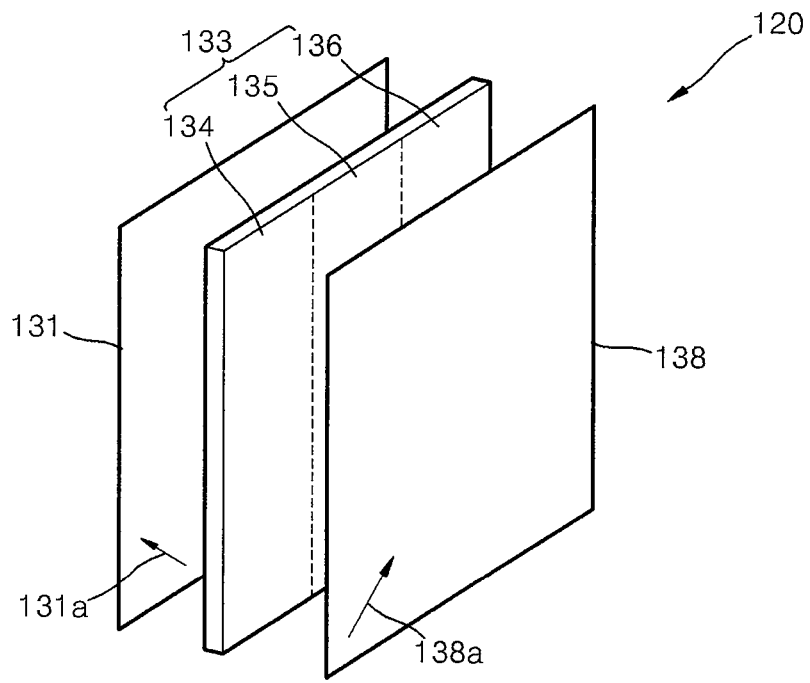
FIG. 4A is a perspective view of an optical shutter used in the autostereoscopic image display system of FIG. 3, according to an exemplary embodiment of the present invention.

FIG. 4A is a perspective view of an optical shutter 120 used in the autostereoscopic image display system of FIG. 3, according to an exemplary embodiment of the present invention. Referring to FIGS. 3 and 4A, the optical shutter 120 according to the current exemplary embodiment may include first and second polarizing plates 131 and 138 and a liquid crystal switch 133 interposed between the first polarizing plate 131 and the second polarizing plate 138, wherein a polarization direction 131a of the first polarizing plate 131 may be perpendicular to a polarization direction 138b of the second polarizing plate 138. The liquid crystal switch 133 may include first to third liquid crystal cells 134, 135, and 136 corresponding to the first to third shutter segments 121, 122, and 123 of the optical shutter 120. Each of the liquid crystal cells 134, 135, and 136 has a stripe shape in a vertical direction, and can be turned on/off independently. The liquid crystal switch 133 may include transparent electrodes corresponding to the shape of the liquid crystal cells 134, 135, and 136 and a liquid crystal disposed between the transparent electrodes. For example, when the liquid crystal cells 134, 135, and 136 are turned on, the polarization direction of transmitted light is changed to a direction perpendicular to the original polarization direction; and when the liquid crystal cells 134, 135, and 136 are turned off, the transmitted light maintains its original polarization direction. As described above, when the liquid crystal cells 134, 135, and 136 are turned on/off, light which has been transmitted through the first polarizing plate 131 may either pass through the second polarizing plate 138 or may be shielded by the second polarizing plate 138.

Figure 4B:
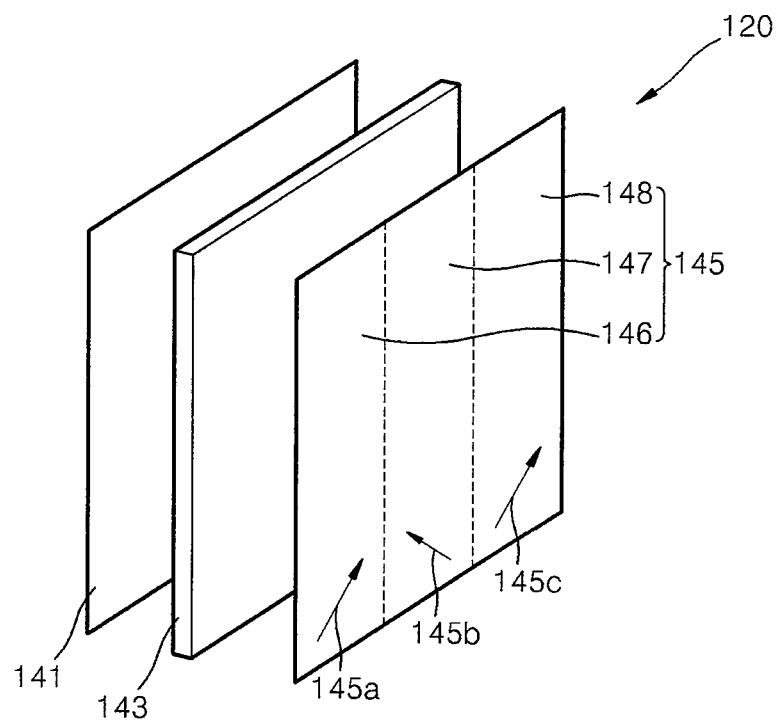
FIG. 4B is a perspective view of an optical shutter used in the autostereoscopic image display system of FIG. 3, according to another exemplary embodiment of the present invention.

FIG. 4B is a perspective view of the optical shutter 120 used in the autostereoscopic image display system of FIG. 3, according to another exemplary embodiment of the present invention. Referring to FIGS. 3 and 4B, the optical shutter 120 may include first and second polarizing plates 141 and 145 and a liquid crystal switch 143 interposed between the first polarizing plate 141 and the second polarizing plate 145. The liquid crystal switch 143 may include transparent electrodes and a liquid crystal interposed between the transparent electrodes. When the liquid crystal switch 143 is turned on/off, the polarization direction of transmitted light can be changed or maintained. The second polarizing plate 145 may include first to third polarizing segments 146, 147, and 148 corresponding to the first to third shutter segments 121, 122, and 123 of the optical shutter 120. In this regard, the first to third shutter segments 121, 122, and 123 have different polarization directions 145a, 145b, and 145c. For example, polarization directions 145a and 145c of the first and third polarizing segment 146 and 148 may be the same as the polarization direction of transmitted light when the liquid crystal switch 144 is turned on, and a polarization direction 145b of the second polarizing segment 147 may be the same as the polarization direction of transmitted light when the liquid crystal switch 144 is turned off. That is, the polarization directions 145a and 145c of the first and third polarizing segments 146 and 148 may be perpendicular to the polarization direction 145b of the second polarizing segment 147. In this regard, light which has passed through the first polarizing plate 141 and the liquid crystal switch 143 may pass either through the first and third polarizing segments 146 and 148 or through the second polarizing segment 147 when the liquid crystal switch 143 is turned on/off.

Figure 5:
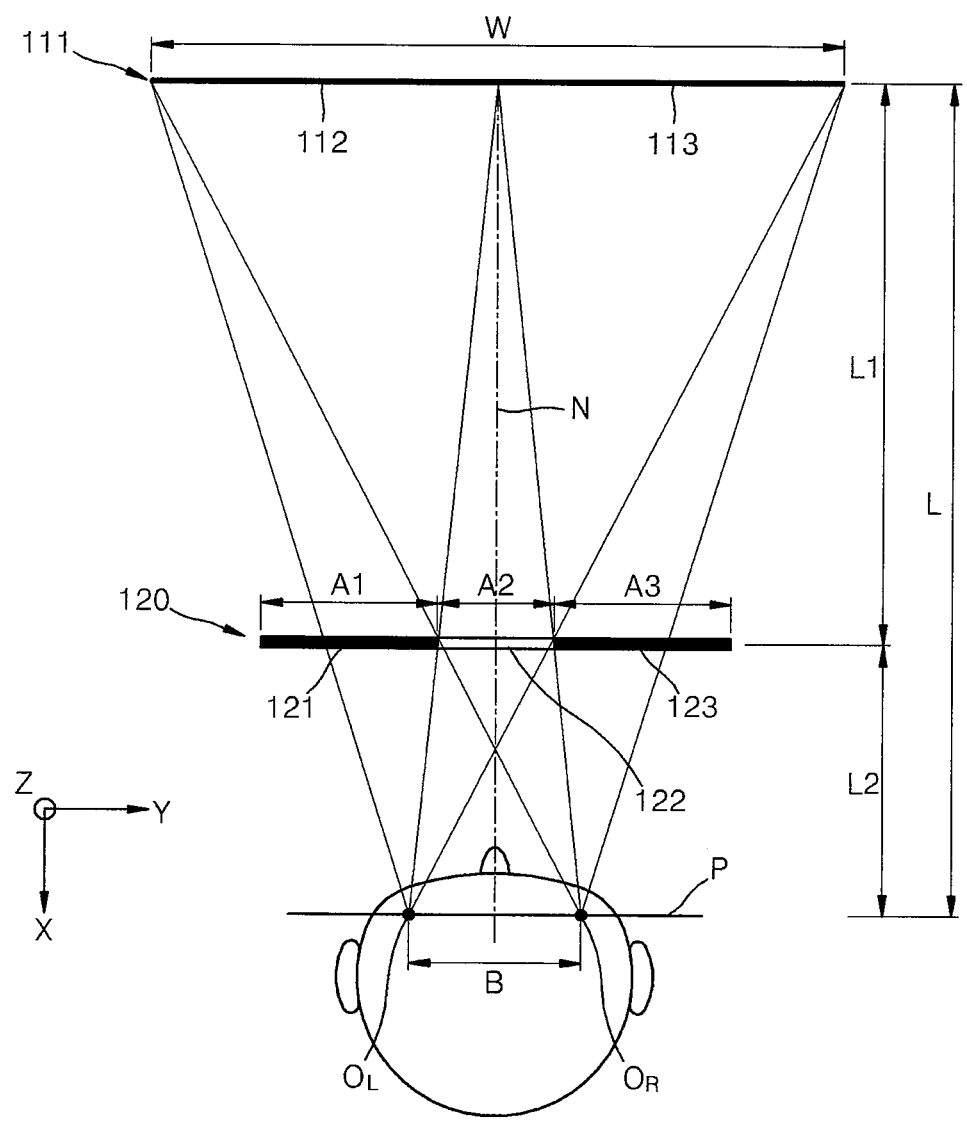
FIG. 5 illustrates the location relationship between optical elements of the autostereoscopic image display system of FIG. 3.

FIG. 5 illustrates the location relationship between optical elements of the autostereoscopic image display system 100 of FIG. 3. The location of the optical shutter 120 will now be described in detail with reference to FIG. 5.

In the current exemplary embodiment, the optical shutter 120 is divided into three shutter segments 121, 122, and 123, the location relationship between the display surface 111 of an image panel and the optical shutter 120 may be given by:

$$\frac{L1}{L2} = \frac{W}{2B} \qquad \text{[Equation 1]}$$

where L1 denotes a distance between the display surface 111 of the image panel and the optical shutter 120, L2 denotes a distance between the optical shutter 120 and a viewer, B is a distance between left and right eyes of the viewer, and W is a horizontal length of the display surface 111 of the image panel. Here, the display surface 111 of the image panel denotes a region on which an image is actually displayed. In FIG. 5, P denotes a line extending through a viewer's left eye ($O_L$) and a viewer's right eye ($O_R$); L denotes a distance between the display surface 111 of the image panel and the line P, that is, a distance between the image panel and the viewer; N denotes a segment of a normal line of the center of the display surface 111. Equation 1 is satisfied when the viewer is spaced apart from the display surface 111 of the image panel by a distance of L.

As identified through Equation 1, when the display surface 111 of the image panel is divided into two display regions 112 and 113 and the optical shutter 120 is divided into three shutter segments 121, 122, and 123, the ratio of L1 to L2 is determined by the horizontal length W of the display surface 111 on which an image is displayed and the distance B between the viewer's left and right eyes. Also, when the distance L1 between the display surface 111 of the image panel and the optical shutter 120 is determined, the location of the viewer, that is, the distance L2 between the optical shutter 120 and the viewer is determined. For example, when a viewer uses an arcade game player, driving and flight simulation devices, or a remote manipulation device, the location of the viewer can be determined in advance according to a conventional location of the viewer's chair. Therefore, the location of the image panel, the optical shutter 120, and the viewer may be appropriately adjusted by using Equation 1. For example, in driving and flight simulation devices, the optical shutter 120 can be attached to a window of a cockpit. In this regard, the location of the image panel may be appropriately adjusted according to the location of a viewer's seat. When the image panel and the optical shutter 120 are manufactured in a single system and their locations are determined in advance, an optimal location of the viewer watching a stereoscopic image may be determined by using Equation 1. Furthermore, if the location of the image panel 110 or the optical shutter 120 can be automatically or manually adjusted, the optimal location of the image panel 110 or optical shutter 120 can be determined by tracking a viewer's location by using a viewer's location tracking sensor. For example, when the horizontal length W of the display surface 111 is 103 cm, the distance B between the viewer's left and right eyes is 6.5 cm, and the distance L1 between the display surface 111 of the image panel and the optical shutter 120 is 300 cm, the distance L2 between the optical shutter 120 and the viewer is determined to be 37.9 cm.

Meanwhile, a horizontal width A2 of the second shutter segment 122 disposed in a central portion of the optical shutter 120 may be given by:

$$A2 = \frac{B}{1 + \frac{2B}{W}}$$ [Equation 2]

Equation 2 can also be satisfied when the viewer is spaced apart from the center of the display surface 111 of the image panel by a predetermined distance. For example, when the horizontal length W of the display surface 111 is 103 cm and the distance B between the viewer's left and right eyes B is 6.5 cm, the horizontal width A2 of the second shutter segment 122 can be determined to be 5.77 cm.

As identified through Equation 2, when the display surface 111 of the image panel is divided into two display regions 112 and 113 and the optical shutter 120 is divided into three shutter segments 121, 122, and 123, the horizontal width A2 of the second shutter segment 122 can be determined by the horizontal length W of the display surface 111 on which an image is displayed and the distance between the viewer's left and right eyes B. Meanwhile, horizontal widths A1 and A3 of the first and third shutter segments 121 and 123 may be the equal to or greater than the horizontal width A2. That is, the horizontal widths of A1 and A3 of the first and third shutter segments 121 and 123 disposed in outer portions of the second shutter segment 122 may be greater than necessarily required so that even when the viewer moves a little bit in a left or right direction, the image is not cut off.

Figure 6A:
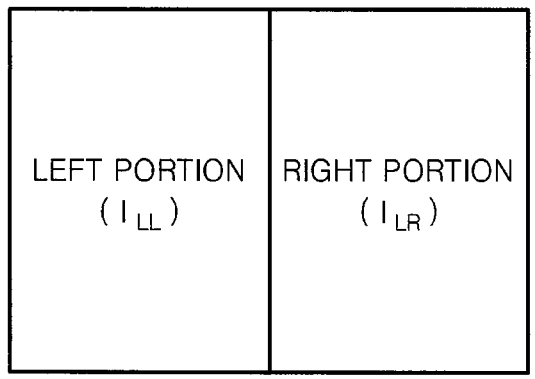
FIGS. 6A and 6B illustrate a stereoscopic image used in the autostereoscopic image display system of FIG. 3.
Figure 6B:
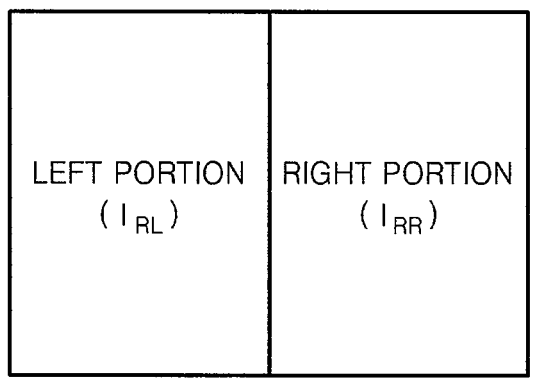
Figure 7A:
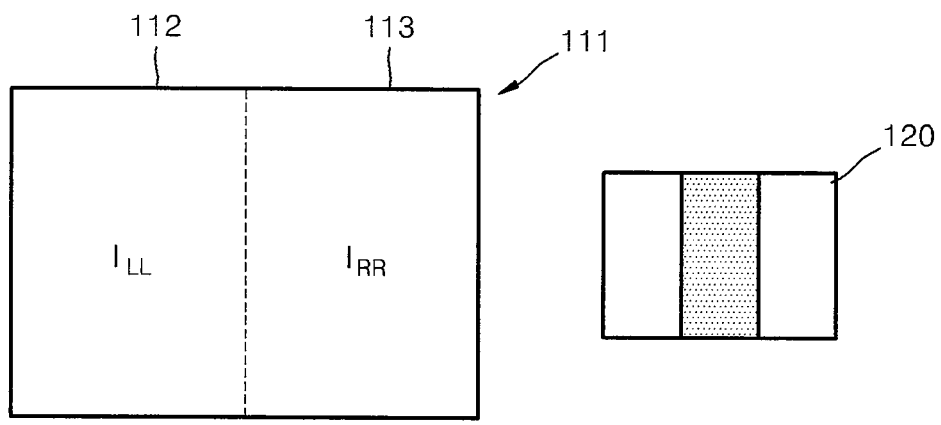
FIGS. 7A and 7B illustrate sequential views of the stereoscopic image used in the autostereoscopic image display system of FIG. 3.
Figure 7B:
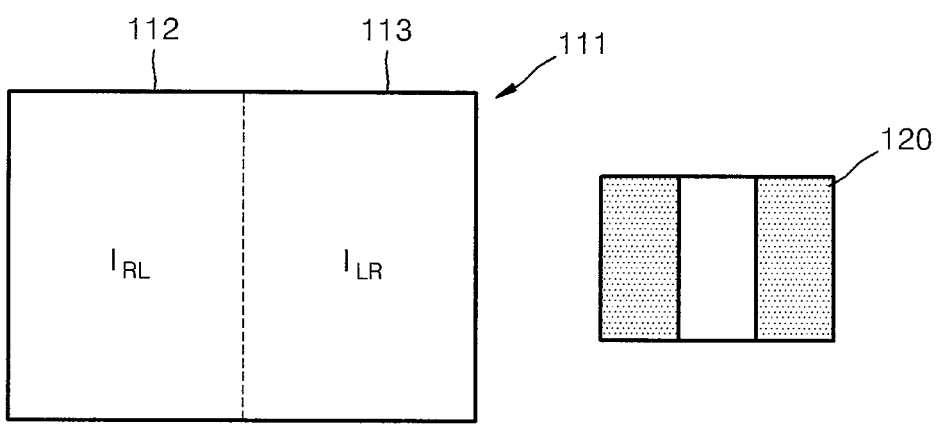

FIGS. 6A and 6B illustrate a stereoscopic image displayed in the autostereoscopic image display system according to the current exemplary embodiment of the present invention, and FIGS. 7A and 7B are sequential views of the stereoscopic image displayed in the autostereoscopic image display system according to the current exemplary embodiment of the present invention.

Referring to FIGS. 6A and 6B, the autostereoscopic image display system according to the current exemplary embodiment divides an image for a left eye and an image for a right eye, which are used to display a stereoscopic image into left portions $I_{LL}$ and $I_{RL}$ and right portions $I_{LR}$ and $I_{RR}$, respectively. The image for a left eye and the image for a right eye are images taken at positions of the viewer's left eye and the viewer's right eye, respectively. The viewer's left and right eyes recognize such images and the viewer can watch a stereoscopic image.

The left portions of the image for a left eye and the right portions of the image for a right eye are sequentially displayed as illustrated in FIGS. 7A and 7B. For example, as illustrated in FIG. 7A, the left portion $I_{LL}$ of the image for a left eye and the right portion $I_{RR}$ of the image for a right eye are displayed on the display surface 111 of the image panel. In this regard, the control unit (190 of FIG. 3) controls the optical shutter 120 as illustrated in the right side of FIG. 7A. In this case, referring to FIGS. 7A and 5, the left portion $I_{LL}$ of the image for the left eye is viewed by the left eye $O_L$ of the viewer, and the right portion $I_{RR}$ of the image for the right eye is viewed by the right eye $O_R$ of the viewer. Then, as illustrated in FIG. 7B, the left portion $I_{RL}$ of the image for the right eye and the right portion $I_{LR}$ of the image for the left eye are displayed on the display surface 111 of the image panel. In this regard, the control unit 190 controls the optical shutter 120 as illustrated in the right side of FIG. 7B. In this case, referring to FIGS. 7B and 5, the left portion $I_{RL}$ of the image for the right eye is viewed by the viewer's right eye $O_R$ and the right portion $_{LR}$ of the image for a left eye is viewed by the viewer's left eye $O_L$. As described above, the image for the left eye $O_L$ and the image for the right eye $O_R$ are alternately displayed on each of the display regions 112 and 113 and the control unit 190 controls the optical shutter 120 corresponding to the alternative display of the display regions 112 and 113, thereby producing a stereoscopic image using binocular disparity.

In the current exemplary embodiment, the number of the shutter segments 121, 122, and 123 of the optical shutter 120 is not related to the number of vertical pixels of the image panel, and the shutter segments 121, 122, and 123 may not match with the vertical pixels of the image panel 110. In addition, even when the viewer moves a little bit from its predetermined location, a ghost image that is formed due to the switching of the image for the left eye and the image for the right eye occurs only at boundaries of the shutter segments 121, 122, and 123. Therefore, a fall-off in the image quality due to the ghost image may be relatively small.

Figure 8:
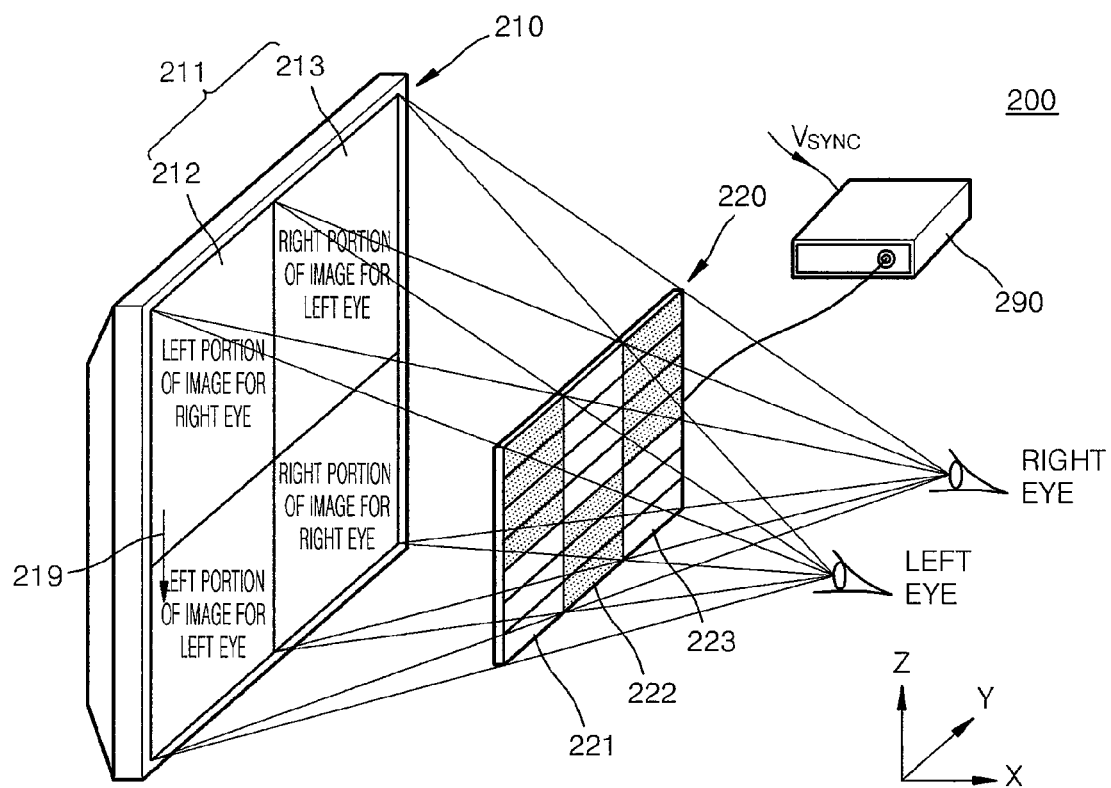
FIG. 8 is a schematic view of an autostereoscopic image display system according to another exemplary embodiment of the present invention.

FIG. 8 is a schematic view of an autostereoscopic image display system 200 according to another exemplary embodiment of the present invention.

Referring to FIG. 8, the autostereoscopic image display system 200 according to the current exemplary embodiment includes an image panel 210, an optical shutter 220, and a control unit 290. The autostereoscopic image display system according to the current exemplary embodiment is substantially the same as the autostereoscopic image display system which has been described with reference to FIGS. 3 to 7B, except that the image panel 210 displays an image line by line and the optical shutter 220 corresponds to line-by-line scanning. Hereinafter, such a difference will be described in detail.

The image panel 210 according to the current exemplary embodiment displays an image for a left eye and an image for a right eye which form a stereoscopic image line by line, and the image panel 210 can be a panel that line-scans an image, such as a LCD panel, an OLED panel, a PDP, or a FED panel. In addition, the current exemplary embodiment can also be used in a CRT display using a spot scanning method.

Like in the previous exemplary embodiment, a display surface 211 of the image panel 210 according to the current exemplary embodiment is divided into first and second display regions 212 and 213, wherein an image for a left eye and an image for a right eye are alternately displayed on each of the first and second display regions 212 and 213. According to the current exemplary embodiment, however, the image for a left eye and the image for a right eye are displayed line by line in each of the first and second display regions 212 and 213 and thus, the image for a left eye and the image for a right eye can be simultaneously displayed in each of the first and second display regions 212 and 213. In FIG. 8, a left portion of the image for a right eye and a left portion of the image for a left eye are simultaneously displayed in the first display region 212, and a right portion of the image for a left eye and a right portion of the image for a right eye are simultaneously displayed in the second display region 213. An arrow 219 indicates that a display image is scanned downward line by line.

The optical shutter 220 is disposed between the image panel 210 and the viewer and guides the images for left and right eyes displayed on the image panel 210 to the left eye and the right eye, respectively, wherein the optical shutter 220 is spaced apart from the image panel 210. The optical shutter 220 includes first to third shutter segments 221, 222, and 223 which are aligned in a horizontal direction. The first to third shutter segments 221, 222, and 223 are switched between a transparent state and a non-transparent state. Each of the first to third shutter segments 221, 222, and 223 includes a plurality of horizontal sub segments. The horizontal sub segments operate corresponding to the line-by-line display of the image panel 210. The optical shutter 220 will be described in detail later with reference to FIG. 9.

The control unit 290 is synchronized with the images for left and right eyes displayed on the image panel 210 and controls the optical shutter 220, which will be described in detail later together with the display of the image panel 210 with reference to FIGS. 10A to 10C.

Figure 9:
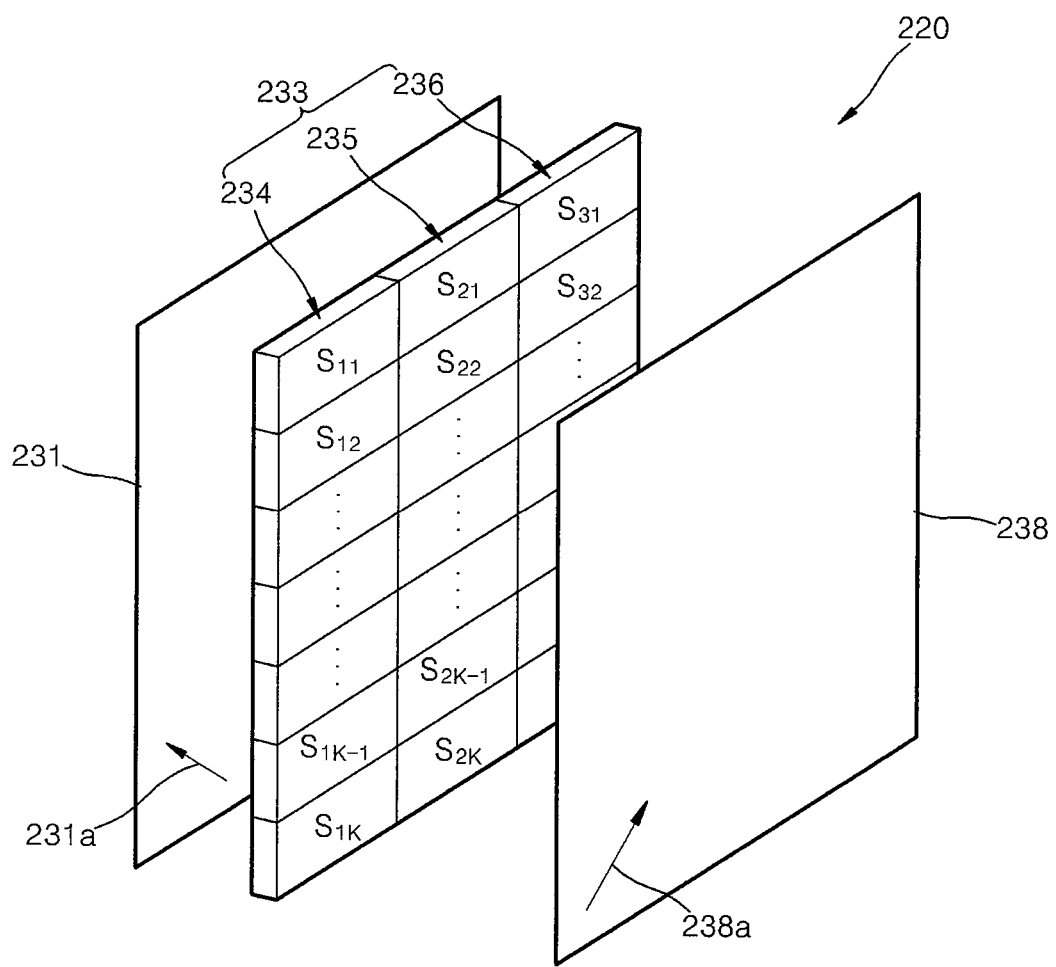
FIG. 9 is a perspective view of an optical shutter used in the autostereoscopic image display system of FIG. 8, according to an exemplary embodiment of the present invention.

FIG. 9 is a perspective view of the optical shutter 220 used in the autostereoscopic image display system 200 of FIG. 8, according to an exemplary embodiment of the present invention. Referring to FIG. 9, the optical shutter 220 may include first and second polarizing plates 231 and 238 and a liquid crystal switch 233 interposed between the first and second polarizing plates 231 and 238, wherein a polarization direction 231a of the first polarizing plate 231 is perpendicular to a polarization direction 238b of the second polarizing plate 238. The liquid crystal switch 233 includes first to third liquid crystal cells 234, 235, and 236, each of which has a vertically long stripe shape. The first to third liquid crystal cells 234, 235, and 236 and the first and second polarizing plate 231 and 238 form the first to third shutter segments 221, 222, and 223 of the optical shutter 220.

The first to third liquid crystal cells 234, 235, and 236 include a plurality of horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...), and the horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...) and the first and second polarizing plate 231 and 238 form horizontal sub segments of the optical shutter 220. The number of the horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...) divided from the liquid crystal cells 234, 235, and 236 may be equal to or smaller than the number of horizontal image lines of the image panel (210 of FIG. 8). The number of the horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...) may be appropriately determined in the range of a few to several tens according to human recognition ability.

The horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...) may be independently turned on/off and include transparent electrodes and a liquid crystal disposed between the transparent electrodes. When the liquid crystal switch 233 is turned on, the horizontal sub liquid crystal cells ($S_{11}$, $S_{12}$, ..., $S_{1K-1}$, $S_{1K}$, $S_{21}$, $S_{22}$, ..., $S_{2K-1}$, $S_{2K}$, $S_{31}$, $S_{32}$, ...) changes the polarization direction of transmitted light to a direction perpendicular to its original polarization direction. When the liquid crystal switch 233 is turned off, the polarization direction of the transmitted light is maintained constant and the transmitted light maintains its original polarization direction. As described above, when the liquid crystal switch 233 is turned on/off, light which has passed through the first polarizing plate 231 either passes through the second polarizing plate 238 or is shielded.

Figure 10A:
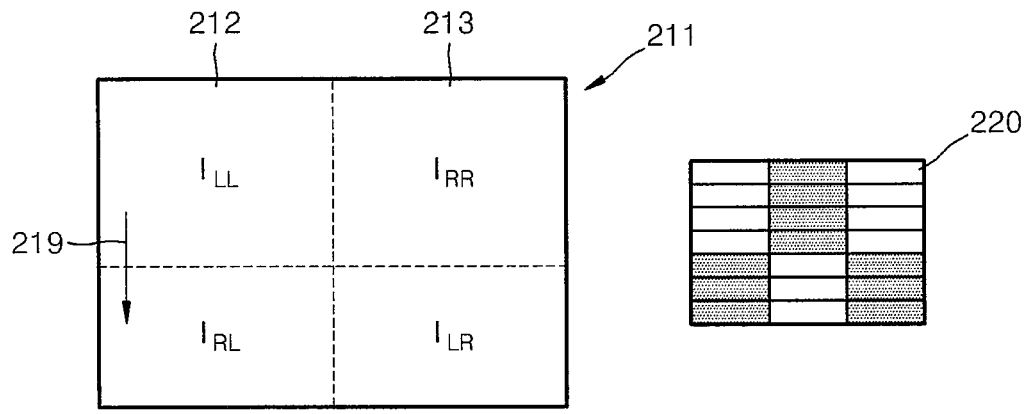
FIGS. 10A to 10C illustrate sequential views of a stereoscopic image displayed in the autostereoscopic image display system of FIG. 8.
Figure 10B:
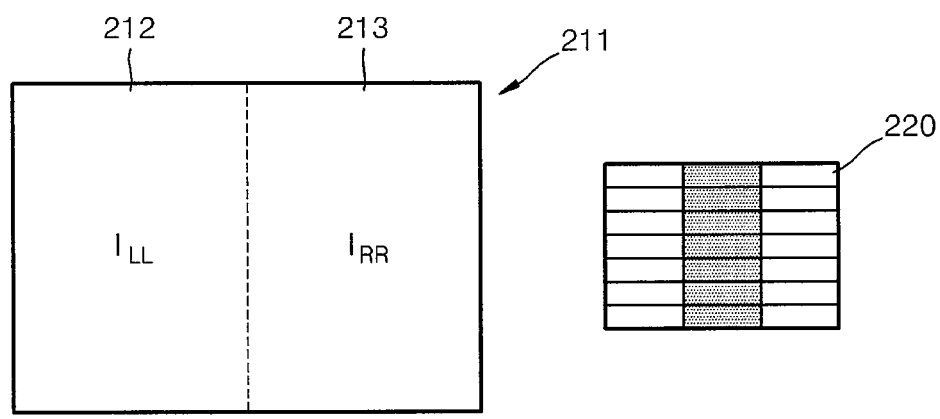
Figure 10C:
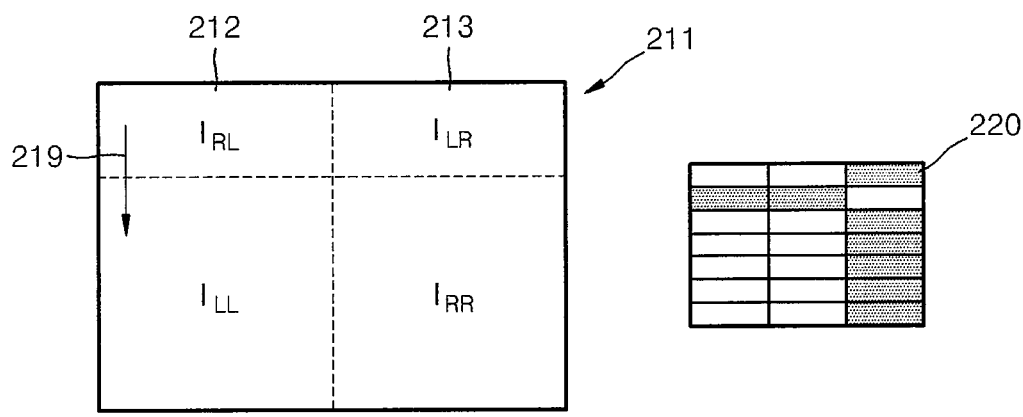

FIGS. 10A to 10C illustrate sequential views of the stereoscopic image displayed in the autostereoscopic image display system according to the current exemplary embodiment. The display image according to the current exemplary embodiment may be substantially the same as the images for left and right eyes which have been described with reference to FIGS. 6A and 6B. However, unlike in the previous exemplary embodiment in which the left portion $I_{LL}$ of the image for a left eye and the left portion $I_{RL}$ of the image for a right eye are alternately displayed in the first display region 112, according to the current exemplary embodiment, as illustrated in FIGS. 10A to 10C, the left portion $I_{LL}$ of the image for a left eye and the left portion $I_{RL}$ of the image for a right eye are displayed line by line in the first display region 212. Likewise, unlike in the previous exemplary embodiment in which the right portion $I_{RR}$ of the image for a right eye and the right portion $I_{LR}$ of the image for a left eye are alternately displayed in the second display region 113, according to the current exemplary embodiment, the right portion $I_{RR}$ of the image for a right eye and the right portion $I_{LR}$ of the image for a left eye are displayed line by line in the second display region 213.

As illustrated in FIGS. 10A to 10C, when the line-by-line displayed image is scanned downward, that is, in the direction of the arrow 159, the control unit (290 of FIG. 8) controls respective horizontal sub segments of the optical shutter 220 such that horizontal sub segments correspond to the line-by-line displayed image.

In the current exemplary embodiment, the shutter segments 221, 222, and 223 of the optical shutter 220 are synchronized with the line-by-line scanned image and sequentially operate in a vertical direction. Therefore, a decrease in image quality due to a cross-talk phenomenon, which is caused by simultaneous displaying of the images for the left and right eyes in each of the display region 212 and 213, can be prevented.

FIG. 11 is a schematic view of an autostereoscopic image display system 300 according to another exemplary embodiment of the present invention.

Referring to FIG. 11, the autostereoscopic image display system 300 according to the current exemplary embodiment includes an image panel 310, an optical shutter 320, a viewer's location tracking sensor 380, and a control unit 390. The autostereoscopic image display system 300 according to the current exemplary embodiment is substantially the same as the autostereoscopic image display system 100 which has been described with reference to FIG. 3, except that the location of shutter segments 321, 322, and 323 of the optical shutter 320 is changed according to the movement of a viewer. Therefore, such a difference will now be described in detail.

The optical shutter 320 according to the current exemplary embodiment includes first to third shutter segments 321, 322, and 323 which are aligned in a horizontal direction. The first to third shutter segments 321, 322, and 323 are switched between a transparent state and a non-transparent state. Each of the first to third shutter segments 321, 322, and 323 includes a plurality of vertical sub segments which can be re-grouped according to the viewer's movement.

The current exemplary embodiment will not be described with respect to the line-by-line display of an image. However, if the image panel 310 displays an image line-by-line, each vertical sub segment of the optical shutter 320 may further include a plurality of horizontal sub segments, like in the previous exemplary embodiment described with reference to FIG. 8, such that the vertical sub segments of the optical shutter 320 are synchronized with the line-by-line scanned image and are sequentially operated in up and down directions.

The control unit 390 is synchronized with the images for left and right eyes displayed in the image panel 310 and controls the optical shutter 320. Furthermore, the control unit 390 controls the optical shutter 320 such that the location of the first to third shutter segments 321, 322, and 323 is changed corresponding to the movement of a viewer. The location change of the first to third shutter segments 321, 322, and 323 will be described with reference to FIG. 13.

Figure 12:
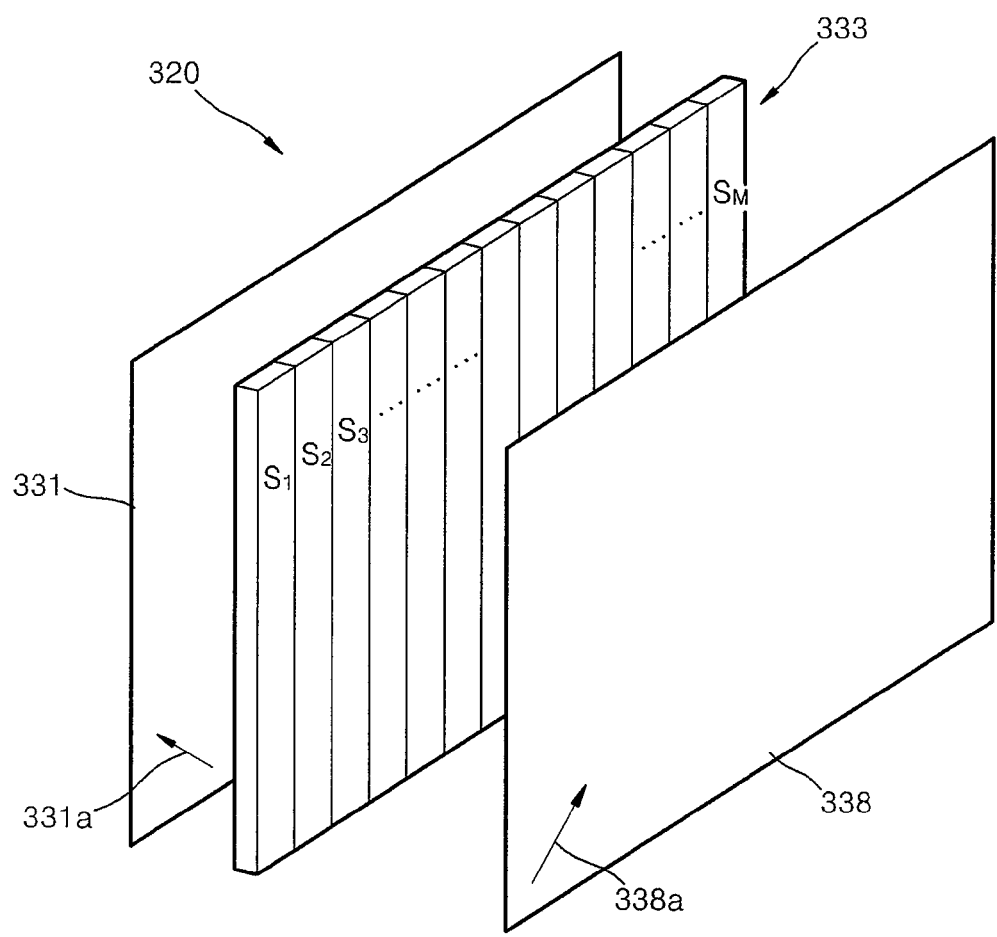
FIG. 12 is a perspective view of an optical shutter used in the autostereoscopic image display system of FIG. 11, according to an exemplary embodiment of the present invention.

FIG. 12 is a perspective view of the optical shutter 320 used in the autostereoscopic image display system of FIG. 11, according to an exemplary embodiment of the present invention. Referring to FIG. 12, the optical shutter 320 according to the current exemplary embodiment may include first and second polarizing plates 331 and 338 and a liquid crystal switch 333 interposed between the first and second polarizing plates 331 and 338, in which a polarization direction 331a of first polarizing plate 331 may be perpendicular to a polarization direction 338a of first polarizing plate 338. The liquid crystal switch 333 includes a plurality of vertical liquid crystal cells ($S_1, S_2, S_3, \ldots, S_M$) which can be independently operated. The number of the vertical liquid crystal cells ($S_1, S_2, S_3, \ldots, S_M$) may be appropriately determined in the range of a few to several hundreds. Such vertical liquid crystal cells ($S_1, S_2, S_3, \ldots, S_M$) are grouped into the first to third shutter segments 321, 322, and 323 of the optical shutter 320 and operated. Respective vertical liquid crystal cells ($S_1, S_2, S_3, \ldots, S_M$) are independently turned on/off and includes transparent electrodes and a liquid crystal interposed between the transparent electrodes. When the liquid crystal switch 333 is turned on, the vertical liquid crystal cells ($S_1, S_2, S_3, \ldots, S_M$) changes the polarization direction of transmitted light to a direction perpendicular to its original polarization direction. When the liquid crystal switch 333 is turned off, the transmitted light maintains its original polarization direction. As described above, when the liquid crystal switch 333 is turned on/off, light which has been transmitted through the first polarizing plate 331 may either pass through the second polarizing plate 338 or may be shielded by the second polarizing plate 338.

Figure 13:
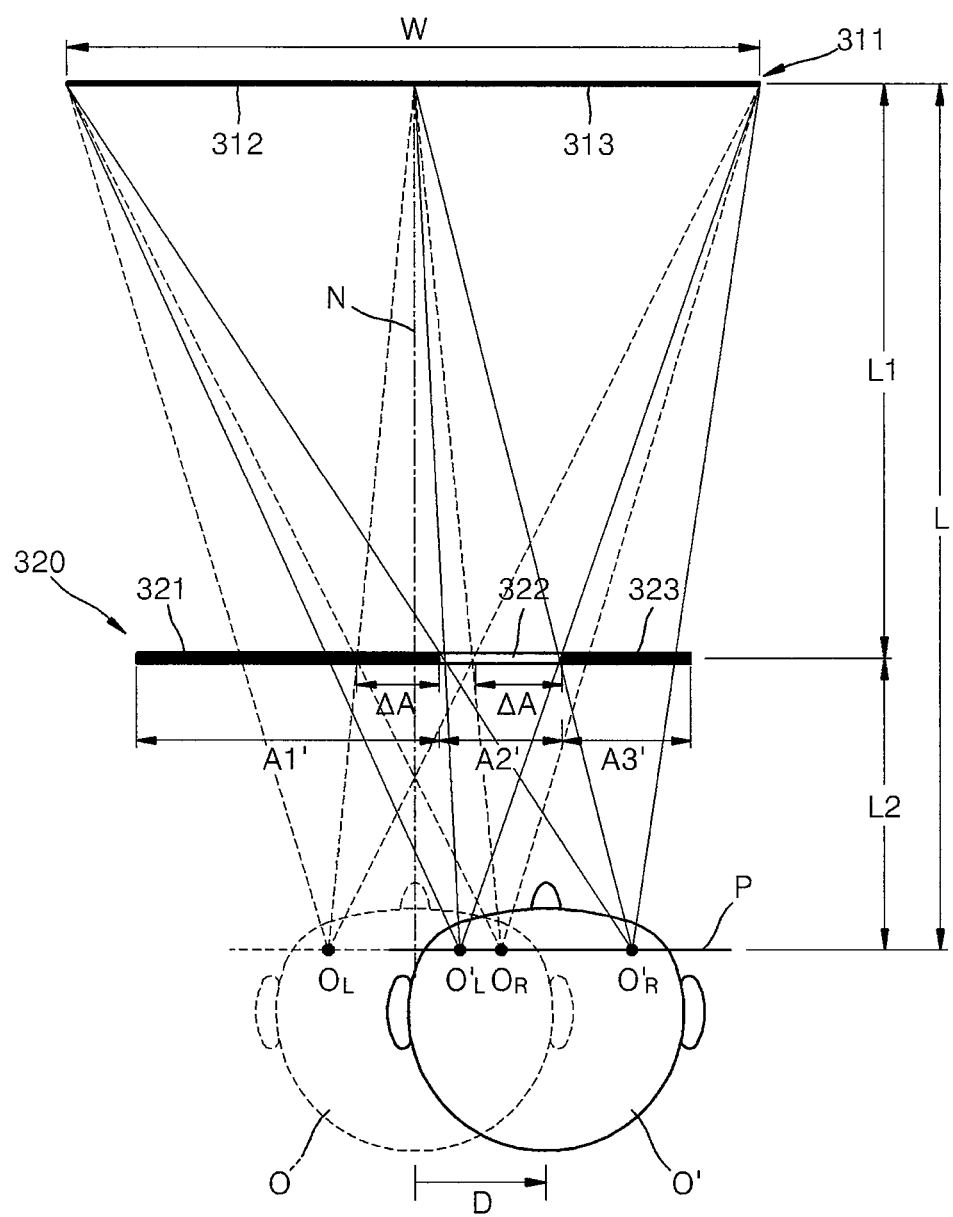
FIG. 13 illustrates the location relationship between optical elements of the autostereoscopic image display system of FIG. 11.

FIG. 13 illustrates the location relationship between optical elements of the autostereoscopic image display system 300 of FIG. 11. Referring to FIG. 13, the location relationship of the first to third shutter segments 321, 322, and 323 will now be described in detail.

When a viewer O is spaced apart from the center of the display surface 311 of an image panel by a distance L, the optical shutter 320 satisfies the location relationship which has been described with reference to FIG. 5 and Equations 1 and 2. FIG. 13 also illustrates the location relationship between the first to third shutter segments 321, 322, and 323 of the optical shutter 320 when a viewer O is moved to a viewer O' by a distance D in a horizontal direction of the display surface 311 of an image display, that is, when a left eye $O_L$ and right eye $O_R$ of the viewer O are respectively shifted to a left eye $O_L$ and right eye $O_R$ of the viewer O' by a distance of D along line P. The location of the image pathway when the left eye $O_L'$ of the moved viewer O' views the first display region 312 may be different from the location of the image pathway when the left eye $O_L$ of the before-movement viewer O views the first display region 312, and thus, the width of the first shutter segment 321 of the optical shutter 320 is changed to A1'. Likewise, the width of the third shutter segment 323 is changed to A3'. Such a width variance ΔA of the first and third shutter segments 321 and 323 may be given by:

$$\Delta A = |A1' - A1| = |A2' - A2| = \frac{L2}{L1 + L2}D \quad \text{[Equation 3]}$$

where L1 and L2 are the same as in Equation 1, A1 and A2 are widths of the first and third shutter segments 321 and 323 illustrated in FIG. 5, and the width A2' of the second shutter segment 322 is the same as A2 in Equation 2. As the widths of the first and third shutter segments 321 and 323 vary, the boundaries between the first to third shutter segments 321, 322, and 323 are shifted by ΔA in the movement direction of the viewer O and O'.

Referring to Equation 3, for the cases where the viewer O and O' moves, a vertical length of the optical shutter 320 may be three times greater than the width A2' of the second shutter segment 322. That is, the first and third shutter segments 321 and 323 disposed in outer portions of the second shutter segment 322 may have greater widths than necessarily required and may have widths A1' and A3', and thus, when the viewer O and O' moves in a left or right direction, the first to third shutter segments 321, 322, and 323 can vary.

Figure 14:
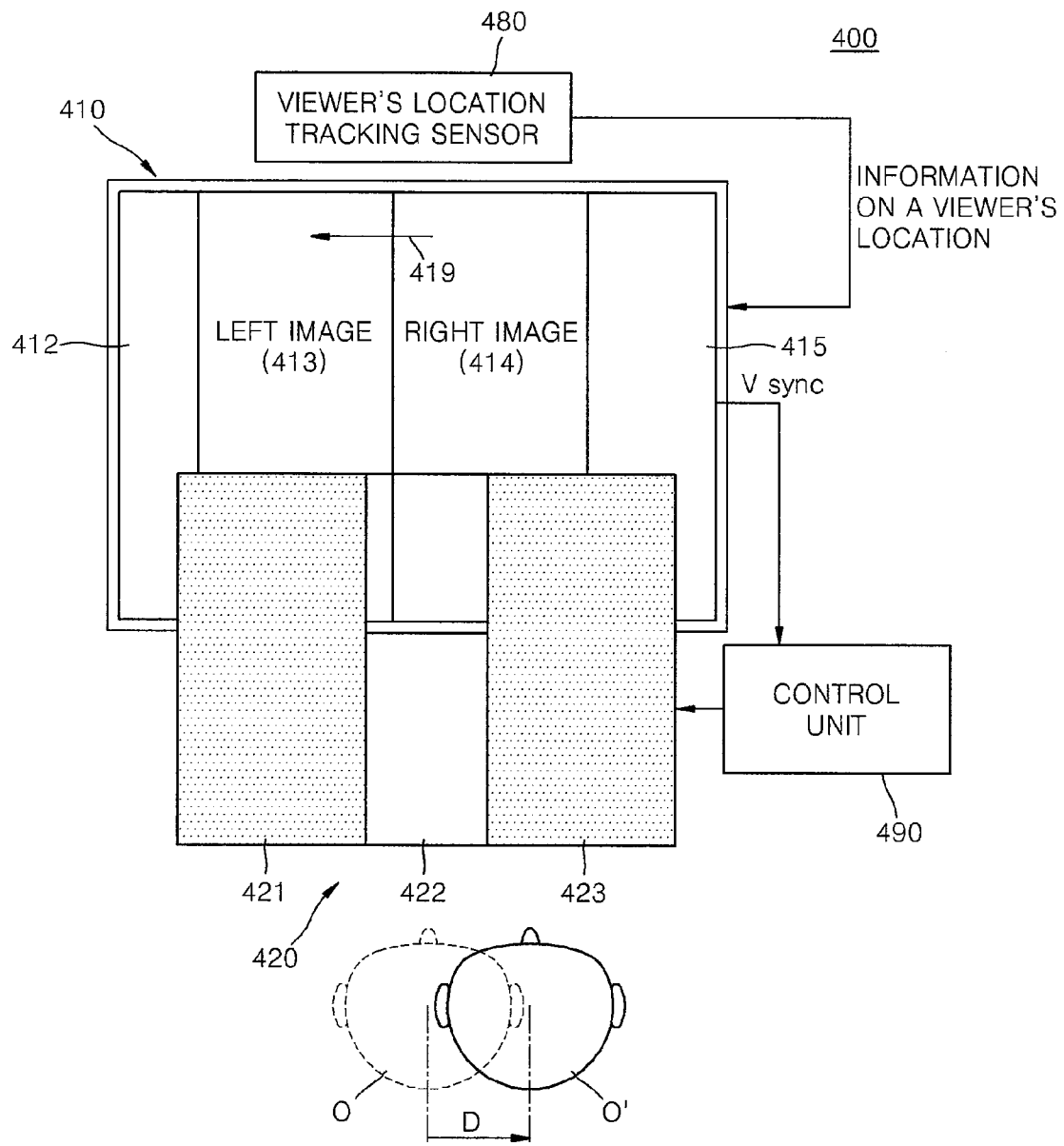
FIG. 14 is a schematic view of an autostereoscopic image display system according to another exemplary embodiment of the present invention.

FIG. 14 is a schematic view of an autostereoscopic image display system 400 according to another exemplary embodiment of the present invention.

Referring to FIG. 14, the autostereoscopic image display system 400 according to the current exemplary embodiment includes an image panel 410, an optical shutter 420, a viewer's location tracking sensor 480, and a control unit 490. The autostereoscopic image display system 400 according to the current exemplary embodiment is substantially the same as the autostereoscopic image display system which has been described with reference to FIG. 11, except that the location of display regions 413 and 414 of the image panel 410 is changed according to a viewer's location. Hereinafter, such a difference will be described in detail.

The image panel 410 according to the current exemplary embodiment is substantially the same as the image panel 110 which has been described with reference to FIG. 3, except that a displayable surface 411 is larger than first and second display regions 413 and 414.

The displayable surface 411 of the image panel 410 includes the first and second display regions 413 and 414 and left and right space margins 412 and 415. An image may also be displayed in the left and right space margins 412 and 415 according to the location of a viewer O and O'. An image for a left eye and an image for a right eye are alternately displayed in each of the first and second display regions 413 and 414. When the viewer O is moved to the viewer O' in the right direction, the first and second display regions 413 and 414 in the display surface 411 may be shifted in the left direction. Such a movement of the first and second display regions 413 and 414 will be described in detail later with reference to FIG. 15.

The optical shutter 420 is interposed between the image panel 410 and the viewer O and O' and guides images for left and right eyes displayed in the image panel 410 to the viewer's left and right eyes, respectively. The optical shutter 420 is substantially the same as the optical shutter 120 which has been described with reference to FIG. 3. The optical shutter 420 according to the current exemplary embodiment may be substantially the same as the optical shutter which has been described with reference to FIG. 4A or 4B. Furthermore, the current exemplary embodiment is not described with the line-by-line displayed image. However, if the image panel 410 displays an image line by line, the optical shutter 420 may include a plurality of horizontal sub segments which have been described in the previous exemplary embodiment with reference to FIG. 8 and the horizontal sub segments are synchronized with line-by-line image scanning and are sequentially operated in up and down directions.

The control unit 490 is synchronized with the image for a left eye and the image for a right eye, which are displayed on the image panel 410, and controls the optical shutter 420. Furthermore, the control unit 490 changes the location of the viewer O and O'.

Figure 15:
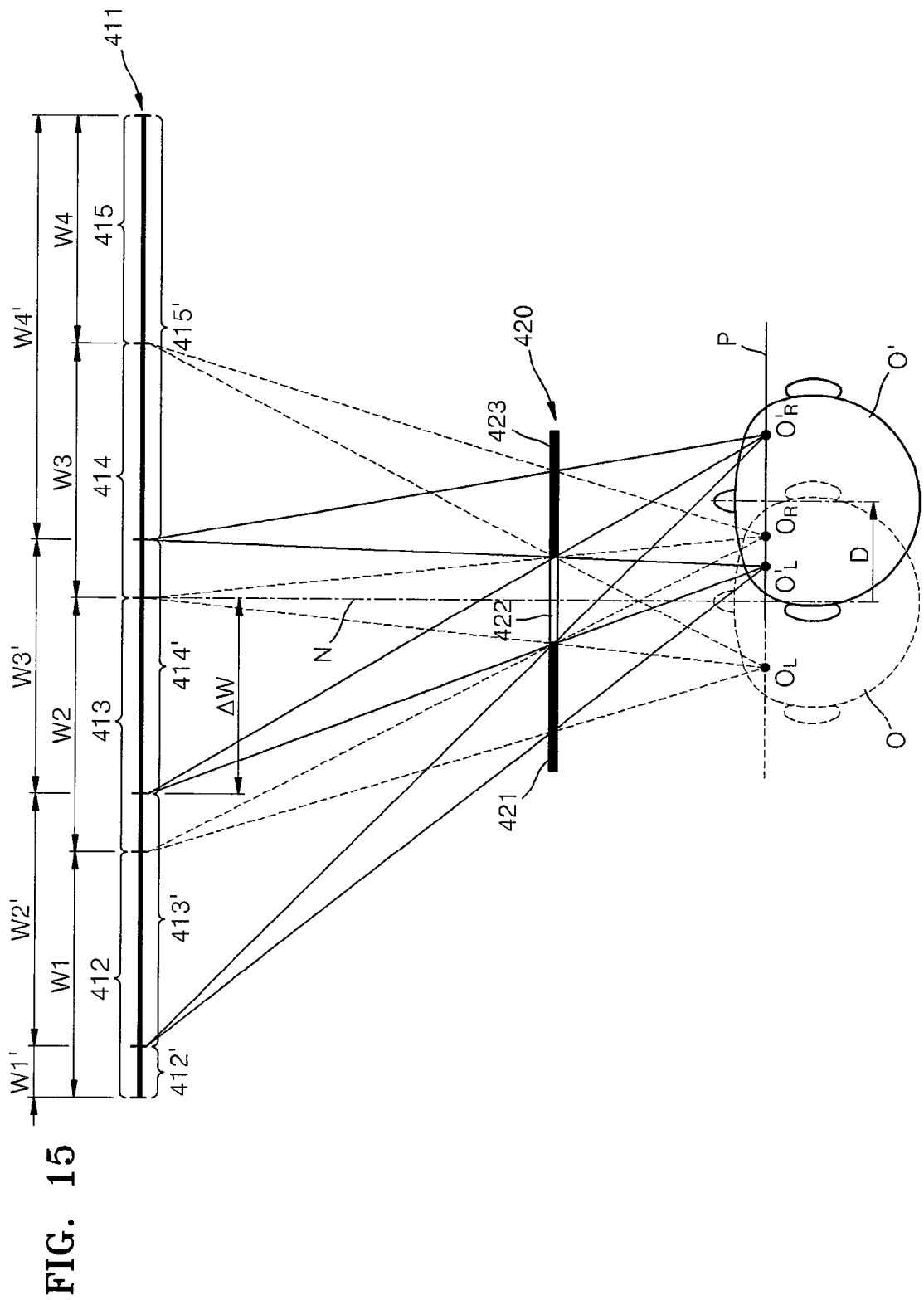
FIG. 15 illustrates the location relationship between optical elements of the autostereoscopic image display system of FIG. 14.

FIG. 15 illustrates the location relationship between optical elements of the autostereoscopic image display system 400 of FIG. 14. The location relationship between the first and second display regions 413 and 414 will now be described with reference to FIG. 15.

When the viewer O is spaced apart from the center of the display surface 411 of the image panel by a distance of L, the first and second display regions 413 and 414 satisfy the location relationship which has been described with reference to FIG. 5 and Equations 1 and 2. FIG. 15 illustrates the location relationship between left and right space margins 412' and 415' and the first and second display regions 413' and 414' in the display surface 411 when the left eye $O_L$ and right eye $O_R$ of the viewer O are shifted along the line P to become the left eye $O_L'$ and right eye $O_R'$ of the viewer O'. The first and second display regions 413' and 414' viewed by the left eye $O_L'$ or right eye $O_R'$ of the viewer O' through the optical shutter 420 may be shifted from the first and second display regions 413 and 414 viewed by the left eye $O_L$ or right eye $O_R$ of the viewer O through the optical shutter 420 in the left direction. In this regard, the movement width ΔW of the first and second display regions 413' and 414' is given by:

$$\Delta W = |W1' - W1| = |W4' - W4| = \frac{DW}{2B} \quad \text{[Equation 4]}$$

where B denotes a distance between right and left eyes; W denotes a horizontal length of the first and second display regions 413 and 414; W1 and W4 denote widths of left and right space margins 412 and 415 when the viewer O is spaced apart from the center of the display surface 411 of the image panel in a distance of L; and W1' and W4' denote widths of left and right space margins 412' and 415' after the movement of the viewer O. As described above, even when the first and second display regions 413 and 414 are changed to the first and second display regions 413' and 414' and the width of the left and right space margins 412 and 415 is changed to the width of the left and right space margins 412' and 415', the widths W2' and W3' of the first and second display regions 413' and 414' after the movement are the same as the widths W2 and W3 of the first and second display regions 413 and 414 before the movement.

Figure 16:
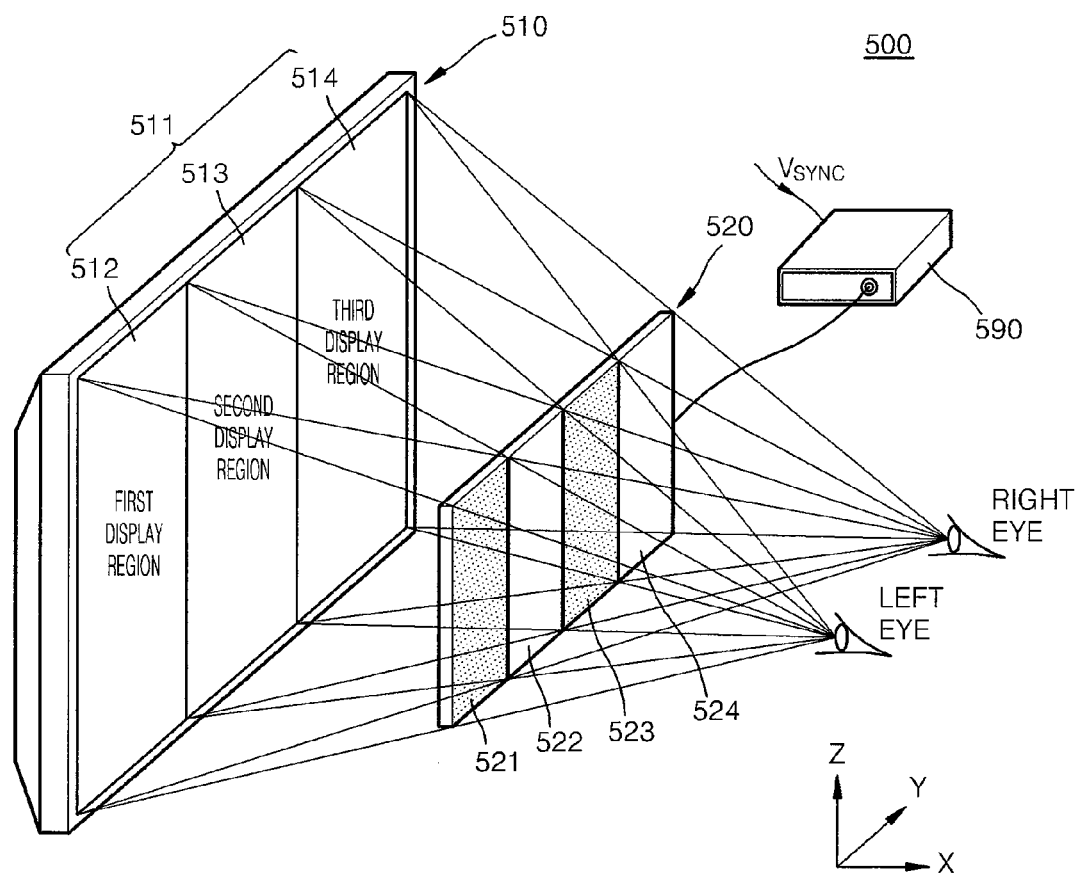
FIG. 16 is a schematic view of an autostereoscopic image display system according to another exemplary embodiment of the present invention.

FIG. 16 is a schematic view of an autostereoscopic image display system 500 according to another exemplary embodiment of the present invention.

Referring to FIG. 16, the autostereoscopic image display system 500 according to the current exemplary embodiment includes an image panel 510, an optical shutter 520, and a control unit 590.

The image panel 510 displays an image for a left eye and an image for a right eye, which form a stereoscopic image. The image panel 510 is substantially the same as the image panel 110 which has been described with reference FIG. 3, except that a display surface 511 is divided into first to third display regions 512, 513, and 514. The image for a left eye and the image for a right eye are alternately displayed in each of the first to third display region 512, 513, and 514. The first to third display regions 512, 513, 514 are divided in a vertical direction and aligned in a horizontal direction, and thus the boundaries of the first to third display regions 512, 513, 514 are vertical. A display type of the first to third display regions 512, 513, and 514 will be described later with reference to FIGS. 18A to 19B.

The optical shutter 520 is disposed between the image panel 510 and the viewer and guides the image for a left eye displayed in the image panel 510 to a left eye and the image for a right eye displayed in the image panel 510 to a right eye, in which the optical shutter 520 is spaced apart from the image panel 510. The optical shutter 520 may be substantially the same as the optical shutter 120 which has been described with reference to FIG. 3, except that the optical shutter 520 is divided into first to fourth shutter segments 521, 522, 523, and 524 corresponding to the first to third display regions 512, 513, and 514. The minimum value of the size of the optical shutter 520 may be determined according to the location relationship between the image panel 510 and the optical shutter 520, which will be described later with reference to FIG. 17. FIG. 16 illustrates an exemplary embodiment of a display image on the image panel 510 and the state of the optical shutter 520.

The control unit 590 is synchronized with an image for a left eye and an image for a right eye, which are displayed on the image panel 510, and controls the optical shutter 520, which will be described later with reference to FIGS. 18A to 19B together with the image panel 510 showing a specific display.

Figure 17:
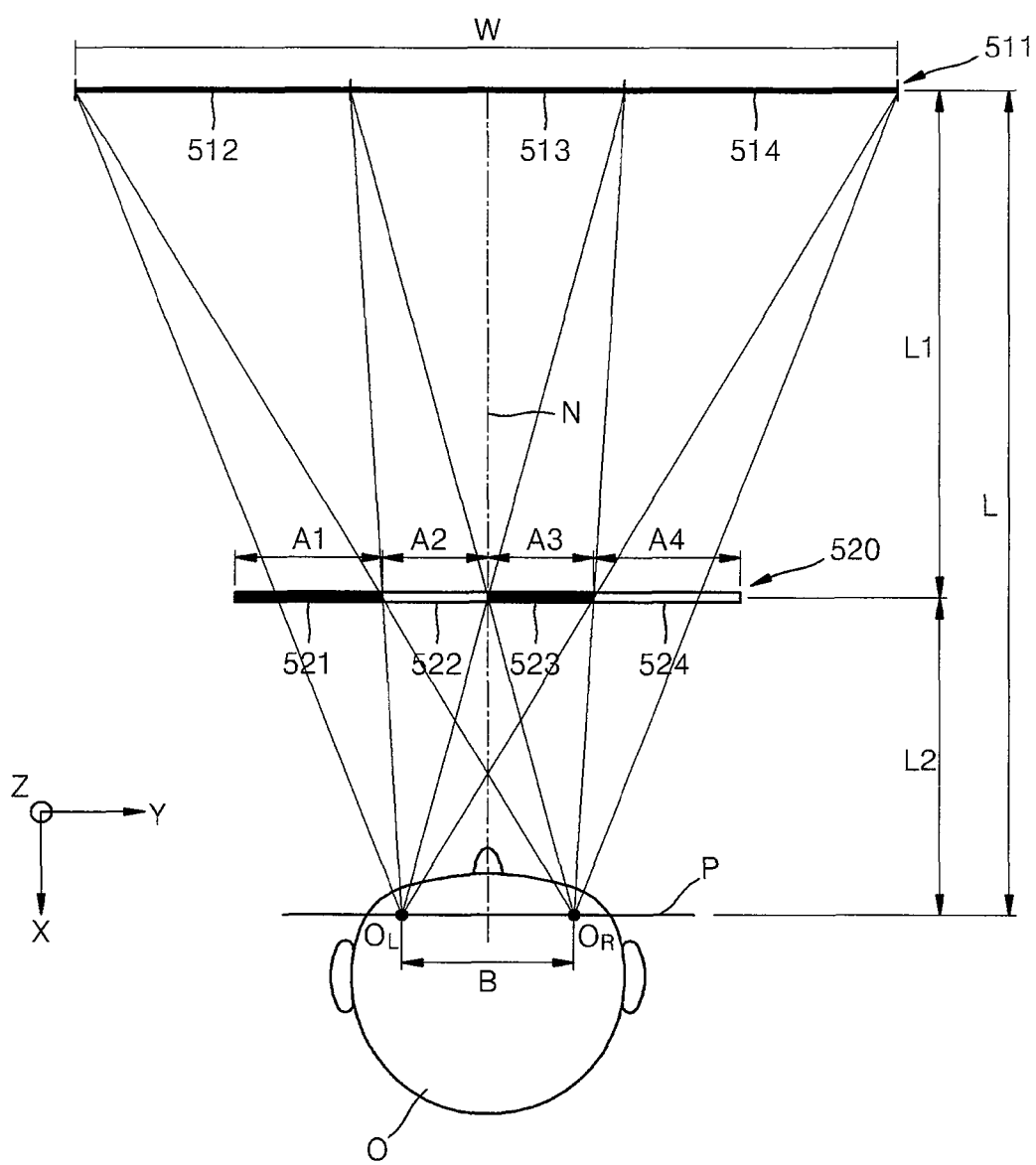
FIG. 17 illustrates the location relationship between optical elements of the autostereoscopic image display system of FIG. 16.

FIG. 17 illustrates the location relationship between optical elements of the autostereoscopic image display system 500 according to the current exemplary embodiment. The location relationship between the first to third display regions 512, 513, and 514 of the image panel and the shutter segments 521, 522, 523, 524 and the optical shutter 520 will now be described in detail with reference to FIG. 17.

When the optical shutter 520 is divided into four shutter segments 521, 522, 523, and 524, the location relationship between the display surface 511 of the image panel and the optical shutter 520 is given by Equation 5:

$$\frac{L1}{L2} = \frac{W}{3B} \quad \text{[Equation 5]}$$

where L1, L2, W, and B are the same as in Equation 1.

Also, horizontal widths A2 and A3 of the second and third shutter segments 522 and 523 in an inner portion of the optical shutter 120 are given by:

$$A2 = A3 = \frac{B}{1 + \frac{3B}{W}}$$ [Equation 6]

Equation 6 is also satisfied when a viewer is spaced apart from the center of the display surface 511 of the image panel by a distance of L.

As identified from Equations 5 and 6, when the display surface 511 of the image panel is divided into three display regions 512, 513, and 514 and the optical shutter 120 is divided into four shutter segments 521, 522, 523, and 524, a ratio of L1 to L2 is determined by the horizontal length W of the display surface 511 on which an image is displayed and the distance B between the viewer's left and right eyes, and the horizontal widths A2 and A3 of the second and third shutter segments 522 and 523 disposed in the inner portion of the optical shutter 520 is determined by the horizontal length W of the display surface 511 on which an image is displayed and the distance between the viewer's left and right eyes B. Meanwhile, the horizontal widths A1 and A4 of the first and fourth shutter segments 521 and 524 may be equal to or greater than the A2.

Figure 18A:
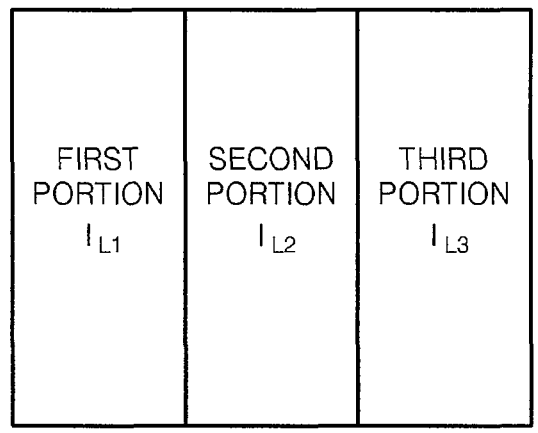
FIGS. 18A and 18B illustrate a stereoscopic image used in the autostereoscopic image display system of FIG. 16.
Figure 18B:
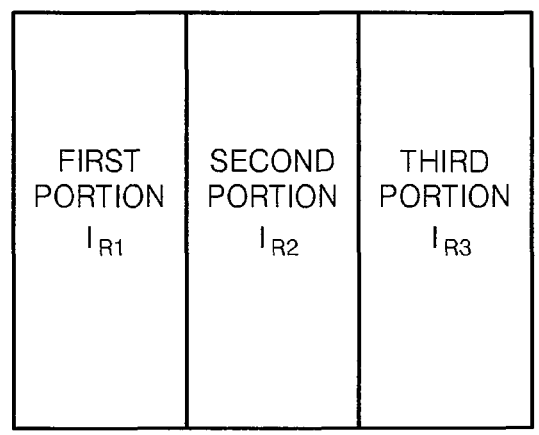
Figure 19A:
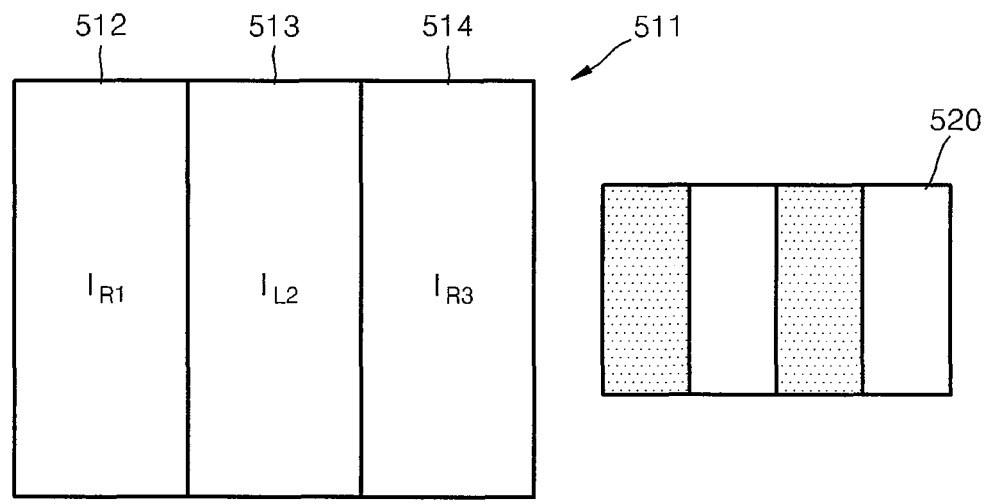
FIGS. 19A and 19B are sequential views of the stereoscopic image used in the autostereoscopic image display system of FIG. 16.
Figure 19B:
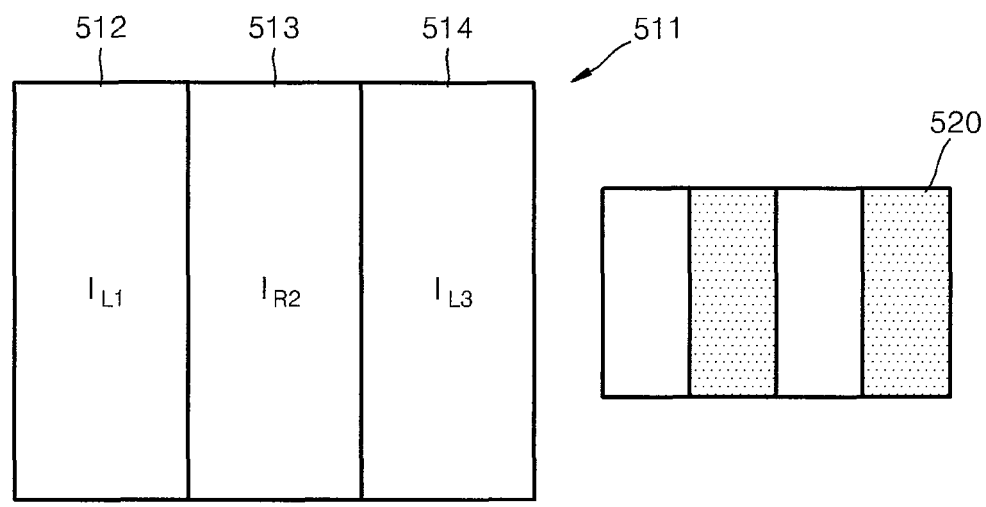

FIGS. 18A and 18B illustrate a stereoscopic image used in the autostereoscopic image display system according to the current exemplary embodiment, and FIGS. 19A and 19B are sequential views of the stereoscopic image used in the autostereoscopic image display system 500 according to the current exemplary embodiment.

Referring to FIGS. 18A to 18B, the autostereoscopic image display system according to the current exemplary embodiment divides an image for a left eye and an image for a right eye which are used in displaying a stereoscopic image into first to third portions $I_{L1}$, $I_{L2}$, and $I_{L3}$ and $I_{R1}$, $I_{R2}$, $I_{R3}$, respectively.

Then, as illustrated in FIG. 19A, the second portion $I_{L2}$ of the image for a left eye and the first and third portions $I_{R1}$ and $I_{R3}$ of the image for a right eye are displayed on the display surface 511 of the image panel. In this regard, the control unit (590 of FIG. 16) controls the optical shutter 520 as illustrated in the right side of FIG. 19A. In this case, referring to FIGS. 19A and 16, the second portion $I_{L2}$ of the image for a left eye is guided to the viewer's left eye $O_L$ and the first and third portions $I_{R1}$ and $I_{R3}$ of the image for a right eye are guided to the viewer's right eye $O_R$.

Then, as illustrated in FIG. 7B, the first and third portions $I_{L1}$ and $I_{L3}$ of the image for a left eye and the second portion $I_{R2}$ of the image for a right eye are displayed on the display surface 511. In this regard, the control unit 590 controls the optical shutter 520 as illustrated in the right side of FIG. 19B. In this case, referring to FIGS. 19B and 16, the first and third portions $I_{L1}$ and $I_{L3}$ of the image for a left eye are guided to the viewer's left eye $O_L$ and the second portion $I_{R2}$ of the image for a right eye is guided to the viewer's right eye $O_R$.

As described above, the display surface 511 illustrated in FIGS. 19A and 19B alternately displays the image for a left eye and the image for a right eye on the first to third display regions 512, 513, and 514, and the control unit 590 controls the optical shutter 120 according to such alternative displaying. Therefore, a stereoscopic image using a binocular image can be realized.

In the previous exemplary embodiments, three or four shutter segments have been described. However, the number of shutter segments is not limited thereto. According to the present invention, an optical shutter can include three or more shutter segments, and a display surface of an image panel is divided into regions, in which the number of divided regions is smaller than the number of the shutter segments of the optical shutter. Equations 1 to 6 used in the previous exemplary embodiments can also be used when the number of shutter segments of an optical shutter is N. According to the present invention, when an optical shutter including N shutter segments is employed, the display surface of the image panel can be divided into N-1 display regions. Also, as described above, when the number of the shutter segments of the optical shutter is N, the location relationship between the image panel, the optical shutter, and location of a viewer is given by:

$$\frac{L1}{L2} = \frac{W}{(N-1)B}$$ [Equation 7]

Also, among N shutter segments, a shutter segment disposed in an inner portion of the optical shutter can have a width AM given by:

$$A_M = \frac{B}{1 + \frac{(N-1)B}{W}}$$ [Equation 8]

Furthermore, as in the previous exemplary embodiment which has been described with reference to FIG. 14, when a viewer is moved in a horizontal direction by a distance D, a movement width ΔW of N-1 display regions of the display surface is given by:

$$\Delta W = \frac{DW}{(N-1)B}$$ [Equation 9]

where L1, L2, W, and B are the same as in Equations 1 to 6, and N is the number of shutter segments of the optical shutter.

Equation 9 shows that the size of optical shutter can decreases as the number of shutter segments comprised in the optical shutter increases. Also, when a display region is shifted according to the viewer's movement in left and right directions as illustrated in FIG. 14, the size of the image panel can be further decreased.

Meanwhile, according to the present invention, a plurality of shutter segments which form an optical shutter are not directly matched with vertical pixels of an image panel. Therefore, the assembly tolerance of the image panel and the optical shutter is greater.

The autostereoscopic display system according to the present invention can display a three-dimensional image of a stereoscopic type, and can be used in an arcade game player, driving and flight simulation devices, remote manipulation device, a museum, or an information kiosk.

An autostereoscopic display system according to the present invention has the following advantages.

First, a stereoscopic image can be viewed without glasses.

Second, the size of an optical shutter can be smaller than the size of an image panel and thus, manufacturing costs can be reduced.

Third, the number of shutter segments of the optical shutter can be less than the number of vertical pixels of the image panel and thus, manufacturing costs can be reduced.

Fourth, there is no need to match the shutter segments of the optical shutter with the vertical pixels of the image panel.

Fifth, there is no limitation on the type of the image panel.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An autostereoscopic display system comprising:
an image panel including at least two display regions, each of which alternately displays an image for a left eye and an image for a right eye;
an optical shutter which is spaced apart from the image panel, including at least three shutter segments capable of being switched between a transparent state and a non-transparent state, and guides an image for a left eye and an image for a right eye which are displayed on the image panel to left and right eyes of a viewer, respectively; and
a control unit which controls the optical shutter being synchronized with the image for a left eye and the image for a right eye which are displayed on the image panel,
wherein when the number of the shutter segments of the optical shutter is N, the number of the display regions is N−1 and
wherein a shutter segment disposed in an inner portion of the optical shutter has a width given by:

$$A_M B/1+N-1\ B/W)$$

where $A_M$ denotes a width of the shutter segment disposed in an inner portion of the optical shutter, B denotes a distance between the left and right eyes of the viewer, N denotes the number of divided shutter segments, and W denotes a horizontal length of an image displayed on the image panel.

2. The autostereoscopic display system of claim 1, wherein the image panel is divided into the display regions in a vertical direction and the shutter segments are aligned in a horizontal direction.

3. The autostereoscopic display system of claim 1, wherein a horizontal length of the optical shutter is equal to a horizontal length of an image displayed on the image panel.

4. The autostereoscopic display system of claim 1, wherein the location relationship between the image panel and optical shutter is given by:

$$L1/L2=W/((N-1)B)$$

where L1 denotes a distance between the image panel and the optical shutter, L2 denotes a distance between the optical shutter and the viewer, B denotes a distance between the left and right eyes of the viewer, N denotes the number of divided shutter segments, and W denotes a horizontal length of an image displayed on the image panel.

5. The autostereoscopic display system of claim 1, wherein the width of a shutter segment disposed in an outer portion of the optical shutter is equal to the width of a shutter segment disposed in the inner portion of the optical shutter.

6. The autostereoscopic display system of claim 1, wherein the image panel is selected from the group including a liquid crystal display (LCD) panel, an organic light-emitting diode (OLED) panel, a plasma display panel (PDP), a projection screen, a field emission display (FED) panel, and a cathode ray tube (CRT) display.

7. The autostereoscopic display system of claim 1, wherein when the image panel displays an image line by line, each of the shutter segments comprises a plurality of horizontal sub segments aligned in a scanning direction of an image line, in which the horizontal sub segments are switched corresponding to the scanning of image lines displayed on the image panel.

8. The autostereoscopic display system of claim 7, wherein the number of horizontal sub segments comprised in each of the shutter segments is equal to the number of the image lines of the image panel.

9. The autostereoscopic display system of claim 7, wherein the number of horizontal sub segments comprised in each of the shutter segments is smaller than the number of the image lines of the image panel.

10. The autostereoscopic display system of claim 1, wherein each of the shutter segments includes a plurality of vertical sub segments which are aligned in a horizontal direction and are independently switched.

11. The autostereoscopic display system of claim 10, further comprising a viewer's location tracking sensor, wherein the control unit re-groups the vertical sub segments according to the location of the viewer detected by the viewer's location tracking sensor and boundaries of the shutter segments are shifted.

12. The autostereoscopic display system of claim 11, wherein a movement distance of the boundaries of the shutter segments is given by:

$$\Delta A=(L2/(L1+L2))\cdot D$$

where $\Delta A$ denotes the movement distance of the boundaries of the shutter segments, D denotes a horizontal movement distance of the viewer, L1 denotes a distance between the image panel and the optical shutter, and L2 denotes a distance between the optical shutter and the viewer.

13. The autostereoscopic display system of claim 1, wherein the size of the image panel is larger than the size of the entire region of at least two display regions on which an image is displayed.

14. The autostereoscopic display system of claim 13, further comprising a viewer's location tracking sensor, wherein the control unit changes the location of at least two display regions according to the location of the viewer detected by the viewer's location tracking sensor and boundaries of the shutter segments are shifted.

15. The autostereoscopic display system of claim 14, wherein a movement distance of the boundaries of at least two display regions is given by:

$$\Delta W=(D\cdot W)/((N-1)B)$$

where $\Delta W$ denotes the movement distance of the boundaries of at least two display regions, D denotes a horizontal movement distance of the viewer, W denotes a horizontal length of a display surface of the image panel, N is the number of divided shutter segments, and B denotes a distance between the left and right eyes of the viewer.

16. The autostereoscopic display system of claim 1, wherein a horizontal length of the optical shutter is smaller than a horizontal length of an image displayed on the image panel.

17. The autostereoscopic display system of claim 1, wherein the width of a shutter segment disposed in an outer portion of the optical shutter is greater than the width of a shutter segment disposed in the inner portion of the optical shutter.

* * * * *